(12) United States Patent
Zhang et al.

(10) Patent No.: US 11,601,042 B2
(45) Date of Patent: Mar. 7, 2023

(54) MULTI-PHASE AC/DC CONVERTER

(71) Applicant: Delta Electronics, Inc., Taipei (TW)

(72) Inventors: Chi Zhang, Apex, NC (US); Zhiyu Shen, Cary, NC (US); Yungtaek Jang, Cary, NC (US); Sheng-Hua Li, Taipei (TW); Ruxi Wang, Cary, NC (US); Peter Mantovanelli Barbosa, Cary, NC (US)

(73) Assignee: Delta Electronics, Inc., Taipei (TW)

( * ) Notice: Subject to any disclaimer, the term of this patent is extended or adjusted under 35 U.S.C. 154(b) by 66 days.

(21) Appl. No.: 17/209,073

(22) Filed: Mar. 22, 2021

(65) Prior Publication Data

US 2021/0359594 A1 Nov. 18, 2021

Related U.S. Application Data

(60) Provisional application No. 63/024,623, filed on May 14, 2020.

(51) Int. Cl.
| | |
|---|---|
| *H02M 1/12* | (2006.01) |
| *H02M 1/42* | (2007.01) |
| *H02M 7/217* | (2006.01) |
| *H02M 7/219* | (2006.01) |
| *H02M 7/23* | (2006.01) |

(52) U.S. Cl.
CPC .......... *H02M 1/4216* (2013.01); *H02M 1/12* (2013.01); *H02M 7/219* (2013.01); *H02M 7/2173* (2013.01); *H02M 7/2195* (2021.05); *H02M 7/23* (2013.01)

(58) Field of Classification Search
CPC .... H02M 1/4216; H02M 1/12; H02M 7/2173; H02M 7/219; H02M 7/2195; H02M 7/23
See application file for complete search history.

(56) References Cited

U.S. PATENT DOCUMENTS

| | | | |
|---|---|---|---|
| 5,654,882 A | 8/1997 | Kanazawa et al. | |
| 6,262,899 B1 * | 7/2001 | Raddi | H02J 9/062 307/66 |
| 7,932,693 B2 | 4/2011 | Lee et al. | |
| 8,687,388 B2 | 4/2014 | Jang et al. | |

(Continued)

FOREIGN PATENT DOCUMENTS

EP 2720357 A2 * 4/2014 ............. H02M 1/44

*Primary Examiner* — Adolf D Berhane
(74) *Attorney, Agent, or Firm* — Hsuanyeh Law Group P.C.

(57) ABSTRACT

The present disclosure provides a three-phase AC/DC converter aiming for low input current harmonic. The converter includes an input stage for receiving a three-phase AC input voltage, an output stage for at least one load, and one or more switching conversion stages, each stage including a plurality of half bridge modules. The switches in each module operate with a substantially fixed 50% duty cycle and are connected in a specific pattern to couple a DC-link and a neutral node of the input voltage. The AC/DC converter further includes one or more controllers adapted to vary the switching frequency of the switches in the switching conversion stages based on at least one of load voltage, load current, input voltage, and DC-link voltage. The converter can also include one or more decoupling stages, such as, inductive components adapted to decouple the output stage from the switching conversion stages.

20 Claims, 38 Drawing Sheets

(56) References Cited

U.S. PATENT DOCUMENTS

| | | |
|---|---|---|
| 8,891,261 B2 | 11/2014 | Jang et al. |
| 9,281,738 B2 * | 3/2016 | Zhou .................... H02M 1/126 |
| 9,455,646 B2 * | 9/2016 | Zhou ...................... H02M 1/12 |
| 2013/0235626 A1 * | 9/2013 | Jang ................... H02M 5/4585 |
| | | 363/37 |
| 2014/0016380 A1 * | 1/2014 | Barbosa ................. H02M 7/49 |
| | | 363/71 |
| 2021/0036632 A1 * | 2/2021 | Hayashi ............... H02M 3/158 |

* cited by examiner

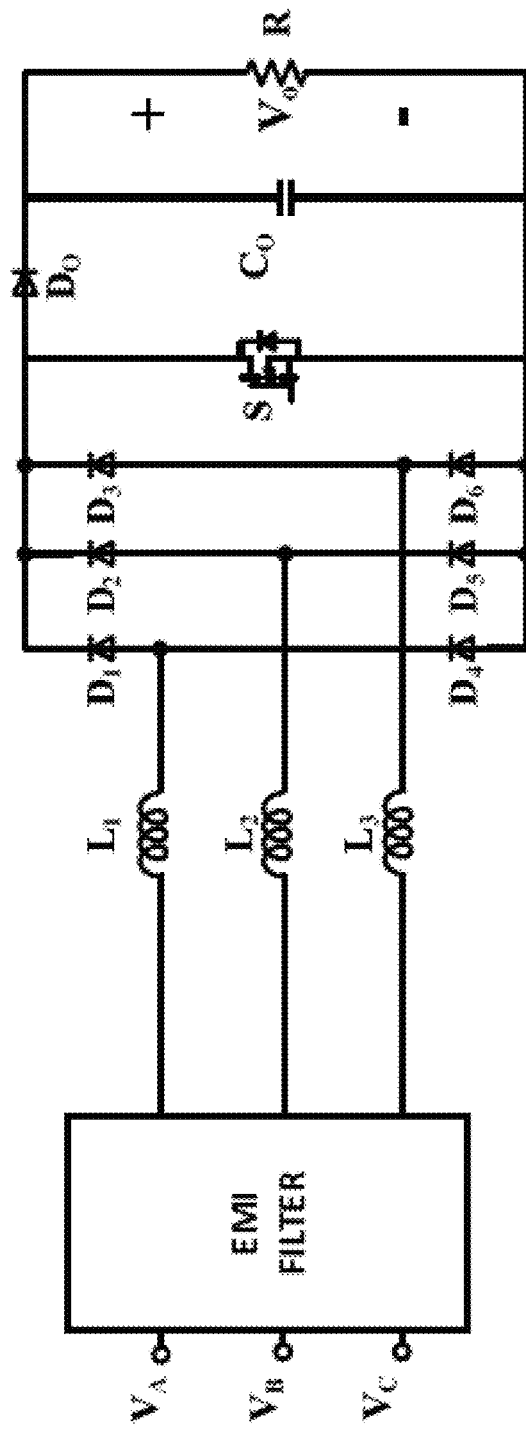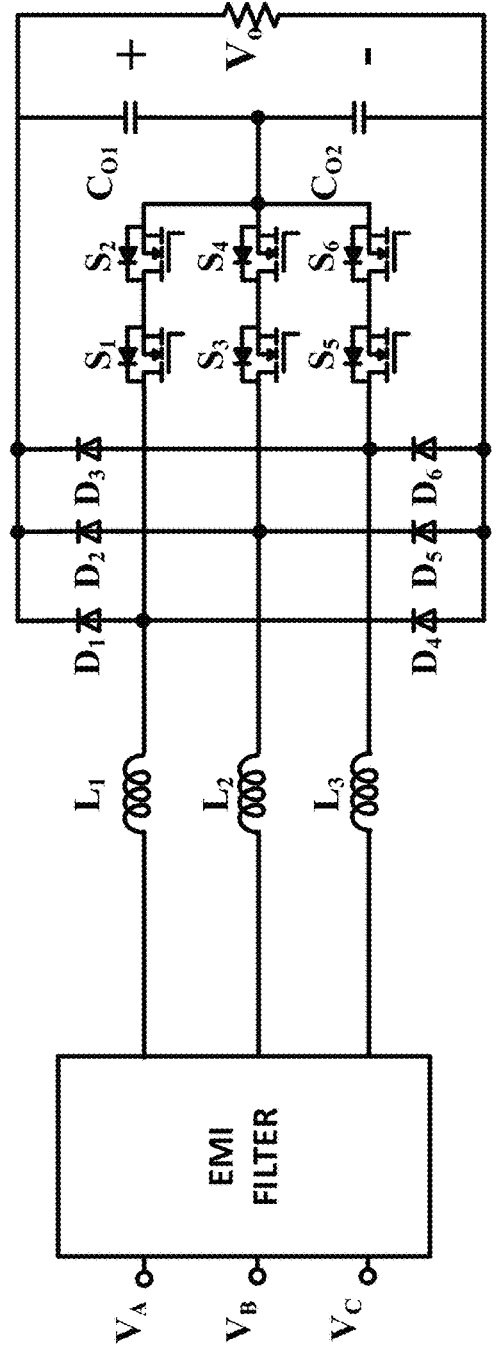
FIG. 1 (Prior Art)
FIG. 2 (Prior Art)

MULTI-PHASE AC/DC CONVERTER

RELATED APPLICATION

This application claims the benefit of priority to U.S. Provisional Application No. 63/024,623, filed May 14, 2020, the entire contents of which are incorporated herein by reference for all purposes.

TECHNICAL FIELD

The present disclosure relates to a multi-phase AC/DC converter. More particularly, the present disclosure relates to a three-phase AC/DC converter with power-factor correction (PFC).

BACKGROUND

Generally, a front-end power-factor-correction (PFC) rectifier is required in three-phase AC/DC applications. The PFC rectifier usually provides low total harmonic distortion (THD) of the input three-phase current and high power factor.

FIG. 1 shows a commonly employed prior art three-phase rectifier with only one switch. This rectifier performs PFC and achieves low THD by operating the boost inductors in the discontinuous-conduction mode (DCM), where the boost inductors are completely discharged in every switching cycle. In the DCM operation, the line current naturally follows the line voltage resulting in improved THD and PF. Because the inductor current is not controlled directly, usually low-bandwidth constant switching frequency control is implemented. As reported in related literature, the rectifier is capable of achieving 10% to 20% THD, which is acceptable in some applications.

To further minimize the current distortion in high power application, Vienna rectifier in FIG. 2 is proposed in the Ref. [1]. Vienna rectifier offers high efficiency AC/DC conversion, low THD of input current and a high power factor. But too many components in the Vienna rectifier are not attractive in low-cost applications.

FIG. 3 shows a six-switch boost converter with the capability for bidirectional power flow. By using the wide-band-gap devices, e.g., SiC devices, it is able to provide both high efficiency and high power density as reported in Ref. [2]. The high cost of wide-band-gap devices is a potential obstacle for this converter to be widely accepted.

FIG. 4 illustrates a two-switch three-phase rectifier proposed in Ref. [3]. By connecting the capacitors $C_1$, $C_2$ and $C_3$ in "Y" connection, a virtual neutral point is obtained. The virtual neutral point is further connected to the mid-point of the two switches and the mid-point of the output capacitors, $C_{O1}$ and $C_{O2}$. This connection partially decouples the phase currents for the most part of the line period by making the three-phase PFC rectifier operate as three independent single-phase PFC rectifiers. This structure is further improved in FIG. 5, which is proposed in Ref. [4]. The rectifier in FIG. 5 provides better electromagnetic interference (EMI) performance by adding an inductively decoupling stage, which makes it suitable in fast high-voltage change applications.

Recently, high input voltage three-phase power supplies are more and more attractive in high power applications, e.g., solid-stage-transformer, because they can deliver more power for the same amount of input current. In order to operate the converters in FIGS. 1 to 5 in high input voltage conditions, one possible approach is to directly replace the low voltage devices with ultra-high voltage devices as reported in Ref. [5]. However, the ultra-high voltage devices are currently not available in the market and will be very costly in near future. Another possible approach is to cascade the front-end bridges to block the high input voltage as reported in Ref. [6]. This approach usually requires a substantial amount of the active switches for the front-end PFC and also needs multiple DC/DC converters to provide galvanic isolation, which further increases the number of the switches for the system.

REFERENCES

[1] J. W. Kolar and F. C. Zach, "A novel three-phase utility interface minimizing line current harmonics of high-power telecommunications rectifier modules," IEEE Transactions on Industrial Electronics, vol. 44, no. 4, pp. 456-467, August 1997.

[2] J. W. Kolar and T. Friedli, "The essence of three-phase PFC rectifier systems," IEEE Trans. Power Electron., vol. 28, no. 1, pp. 176-198, January 2013.

[3] Jianping Ying et al., "Integrated Converter Having Three-Phase Power Factor Correction," U.S. Pat. No. 7,005,759, issued Feb. 28, 2006.

[4] Yungtaek Jang et al., "Three-Phase Soft-Switched PFC Rectifiers," U.S. Pat. No. 8,687,388, issued Apr. 1, 2014.

[5] Madhusoodhanan et al., "Solid-State Transformer and MV Grid Tie Applications Enabled by 15 kV SiC IGBTs and 10 kV SiC MOSFETs Based Multilevel Converters," IEEE Transactions on Industry Applications, vol. 51, no. 4, pp. 3343-3360, July-August 2015.

[6] X. She, A. Q. Huang and R. Burgos, "Review of Solid-State Transformer Technologies and Their Application in Power Distribution Systems," IEEE Journal of Emerging and Selected Topics in Power Electronics, vol. 1, no. 3, pp. 186-198, September 2013.

SUMMARY

In one aspect, the present disclosure provides an AC/DC converter, comprising: a plurality of internal terminals including positive, negative, and neutral internal terminals; an input stage connected to the positive, negative, and neutral internal terminals and having at least three input terminals for connecting to a three-phase AC power source; a switching stage having a plurality of modules, each module having a plurality of switches and a capacitor, at least one of the modules connected to the positive internal terminal, at least one of the modules connected to the negative internal terminal, and at least two of the modules connected to the neutral internal terminal; an output stage connected to the positive internal terminal and configured to provide DC voltage to output terminals for connecting to a load; and a controller having a plurality of control signal outputs connected to the plurality of switches and configured to generate control signals for said switches.

In one embodiment, each module of the plurality of modules has two switches, and the two switches and the capacitor are connected serially in a loop, the module connected to the positive terminal is connected to the positive terminal by a node in the loop connecting the two switches of said module, the module connected to the negative terminal is connected to the negative terminal by a node in the loop connecting one of the switches to the capacitor of said module, a first of the at least two modules connected to the neutral internal terminal is connected to the neutral terminal by a node in the loop connecting one of the switches to the capacitor of said module, and a second of the at least two modules connected to the neutral internal terminal is connected to the neutral terminal by a node in the loop connecting the two switches of said module.

In one embodiment, the switching stage has two modules, a first module of the two modules is both the module connected to the positive terminal and the first of the at least two modules connected to the neutral internal terminal, and a second module of the two modules is both the module connected to the negative terminal and the second of the at least two modules connected to the neutral internal terminal.

In one embodiment, the switching stage has (n+m) modules (n and m being positive integers greater than 1) divided into a first n modules and a second m modules, the first n modules include a $1^{st}$ module of the first n modules which is the module connected to the positive terminal, an n-th module of the first n modules which is the first of the at least two modules connected to the neutral internal terminal, and wherein each i-th ($1 \leq i \leq n-1$) module is connected by a node in the loop connecting one of the switches to the capacitor of said i-th module to a respective (i+1)-th module at a node in the loop connecting the two switches of said (i+1)-th module, and the second m modules include a $1^{st}$ module of the second m modules which is the second of the at least two modules connected to the neutral internal terminal, an m-th module of the second m modules which is the module connected to the negative terminal, and wherein each j-th ($1 \leq j \leq (m-1)$) module is connected by a node in the loop connecting one of the switches to the capacitor of said jth module to a respective (j+1)-th module at a node in the loop connecting the two switches of said (j+1)-th module.

In one embodiment, the switching stage has (2n+2m) modules, where n and m are positive integers, for each module the plurality of switches comprises two switches, and the two switches and the capacitor of each module are connected serially in a loop, the module connected to the positive terminal is connected to the positive terminal by a node in the loop connecting the two switches of said module, the module connected to the negative terminal is connected to the negative terminal by a node in the loop connecting the two switches of said module, a first of the at least two modules connected to the neutral internal terminal is connected to the neutral terminal by a node in the loop connecting the two switches of said module, and a second of the at least two modules connected to the neutral internal terminal is connected to the neutral terminal by a node in the loop connecting the two switches of said module.

In one embodiment, each of the 2n modules is paired with another of the 2n modules and each of the 2m modules is paired with another of the 2m modules, each pair having a common node that for both modules in said pair connects the capacitor of the respective module to one of the switches of the respective module.

In one embodiment, n=1, m=1, the module connected to the positive terminal is paired with the first of the at least two modules connected to the neutral internal terminal, and the module connected to the negative terminal is paired with the second of the at least two modules connected to the neutral internal terminal.

In one embodiment, the output stage comprises a plurality of capacitors connected in series between the positive and negative internal terminals, a transformer having a first winding and a second winding, the first winding having a first terminal and a second terminal connected to the neutral terminal; a resonant inductor and resonant capacitor connected in series between a midpoint node in the series connected plurality of capacitors and the first terminal of the first winding of the transformer; and a full-wave diode bridge connected to the second winding of the transformer and the output terminals.

In one embodiment, the output stage is further connected to the negative and neutral terminals.

In one embodiment, the output stage is a first output stage, the output terminals are first output terminals, and the load is a first load, the converter further comprising a second output stage connected to the negative internal terminal and configured to provide DC voltage to second output terminals for connecting to a second load.

In one embodiment, the output stage is a first output stage, the output terminals are first output terminals, and the positive and negative internal terminals are a first positive and first negative internal terminals, respectively, the converter further comprising: a second positive internal terminal and a second negative internal terminal, wherein the input stage is further connected to said second positive and second negative internal terminals; a second switching stage having a second plurality of modules serially connected between the second positive and second negative internal terminals; and a second output stage connected to the first and second negative internal terminals and configured to provide DC voltage to second output terminals, wherein the first output stage is further connected to the second positive internal terminal.

In another aspect, the present disclosure provides an AC/DC converter comprising: input terminals for connecting to a three-phase input voltage source; an input filter stage coupled to the input terminals and connected to a positive node, a negative node and a neutral node; a switching stage having n half bridge modules, where n is a positive integer greater than 1, the half bridge modules connected in series between the positive and negative node, and having the neutral node connected to a series connection between the j-th and (j+1)-th half bridge modules in the series (where $1 \leq j \leq n-1$); an output stage connected to the positive node and configured to provide DC voltage to output terminals for connecting to a load; and a controller configured to generate control signals on control signal outputs electrically connected to the half bridge modules.

In one embodiment, each half bridge module comprises a capacitor and two switches connected in series in a loop.

In one embodiment, a first node connecting the capacitor to one of the switches of an i-th half bridge module is electrically connected to a second node connecting the two switches of the (i+1)-th half bridge module for $1 \leq i \leq n-1$.

In one embodiment, n is a positive even integer and wherein each half bridge module is paired with another of the half bridge modules forming a series half bridge module, each series half bridge module having a common node that for both half bridge modules in said series half bridge module connects the capacitor of the respective half bridge module to one of the switches of the respective half bridge module.

In one embodiment, each half bridge module having a switch connecting node connecting the switches of said half bridge module, the paired half bridge modules forming each series half bridge module are a top half bridge module and a bottom half bridge module, and the series half bridge modules are connected in series to one another by connecting, for each k (for $2 \leq k \leq n/2$) the switch connecting node of the top half bridge module of the k-th series half bridge module to the switch connecting node of the bottom half bridge module of the (k−1)-th series half bridge module.

In one embodiment, the input filter stage comprises: an electromagnetic interference (EMI) filter connected to the input terminals; a three-phase diode bridge connected to the positive and negative node; a plurality of boost inductors connected to the diode bridge and the EMI filter; and a plurality of capacitors each connected between a boost inductor among the plurality of boost inductors and the neutral node.

In one embodiment, the output stage is further connected to the neutral node.

In one embodiment, the input terminals comprise a source neutral terminal and output stage is further connected to the source neutral terminal.

In one embodiment, the output stage comprises a full-wave diode bridge connected to the output terminals for connecting to the load; a plurality of capacitors connected in series between the positive node and negative node; a transformer having a first winding having first and second terminals, and a second winding connected to the full-wave diode bridge; and a resonant inductor and resonant capacitor connected in series between a midpoint node of the series connected plurality of capacitors and the first terminal of the first winding of the transformer.

In one embodiment, the load is a first load and the output terminals are further configured to connect to a second load.

In still another aspect, the present disclosure provides an AC/DC converter, comprising: input terminals for connecting to a three-phase input voltage source; an input filter stage coupled to the input terminals and connected to a positive node, a negative node and a neutral node; a first switching stage having n half bridge modules (n being a positive integer greater than 1) connected in series between the positive and negative nodes, and having the neutral node connected to a series connection between an i-th and (i+1)-th half bridge modules in said series (where 1≤i≤n−1); a second switching stage having m half bridge modules (m being a positive integer greater than 1) connected in series between the positive and negative node; an output stage connected to the neutral node and to a series connection node between a j-th and (j+1)-th series connected half bridge modules of the second stage (where 1≤j≤n−1), the output stage further having output terminals for connecting to a load; and a controller configured to generate control signals on control signal outputs electrically connected to the half bridge modules of the first and second switching stages.

In one embodiment, the controller is configured to generate control signals for the second stage that are phase shifted relative to control signal for the first stage.

BRIEF DESCRIPTION OF THE DRAWINGS

The present disclosure is better understood upon consideration of the following detailed description and the accompanying figures.

FIG. 1 illustrates a conventional three-phase single-switch PFC DCM boost rectifier circuit.

FIG. 2 illustrates a conventional three-phase Vienna PFC rectifier circuit.

DETAILED DESCRIPTION

The inventors have recognized and appreciated the need for a low cost, low input-current harmonic and high power factor three-phase rectifier with high scalability for high input voltage and high power applications. The present disclosure relates to a three-phase AC/DC converter which offers very low THD of the input current and good power factor with the capability of soft-switching of the active switches. Both isolated and non-isolated rectifier embodiments are described.

Figure 3:
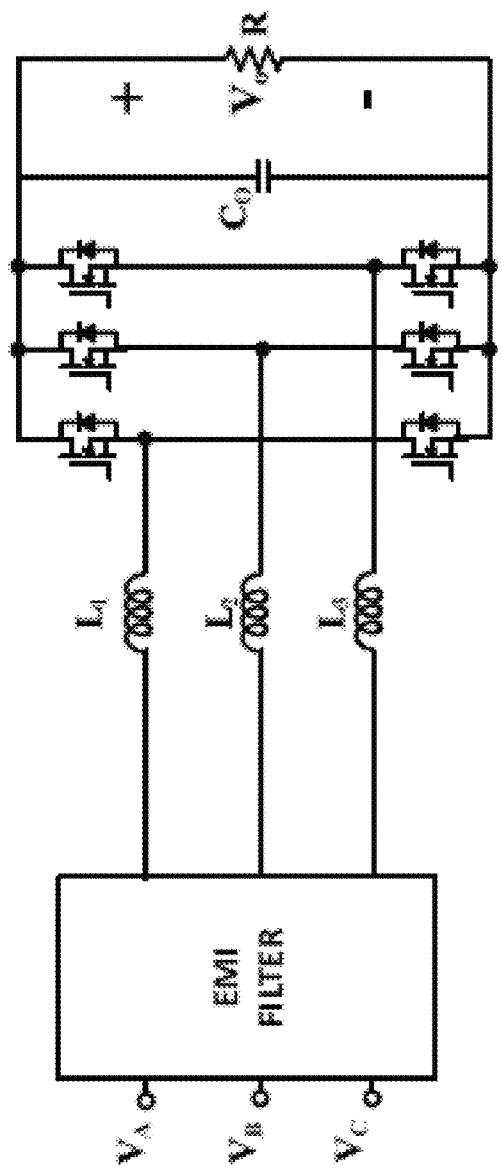
FIG. 3 illustrates a conventional three-phase six-switch PFC boost rectifier circuit.
Figure 4:
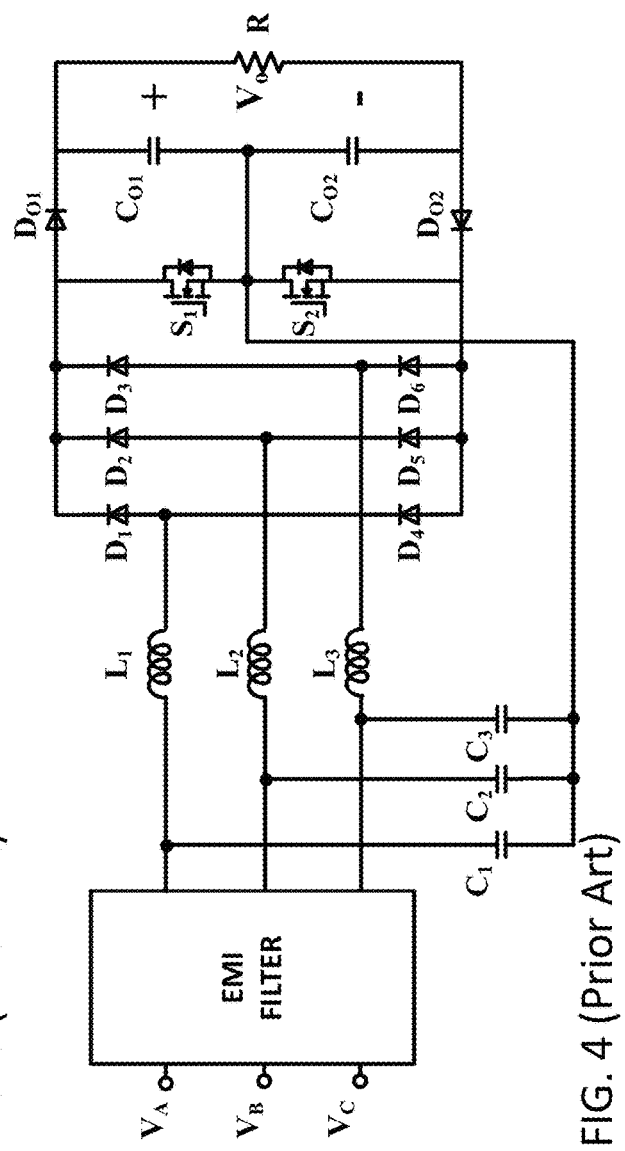
FIG. 4 illustrates a conventional three-phase two-switch PFC DCM boost rectifier circuit with virtual neutral and with split output capacitors.
Figure 5:
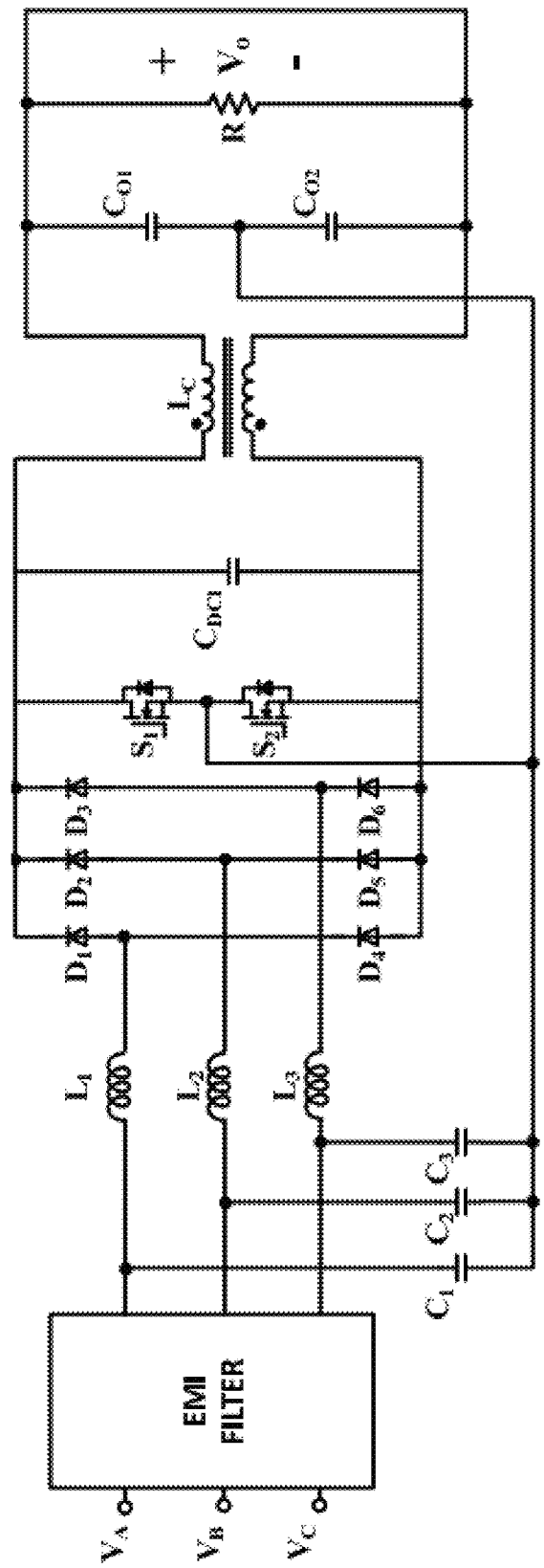
FIG. 5 illustrates a conventional three-phase two-switch zero voltage switching (ZVS) PFC DCM boost rectifier circuit.
Figure 6A:
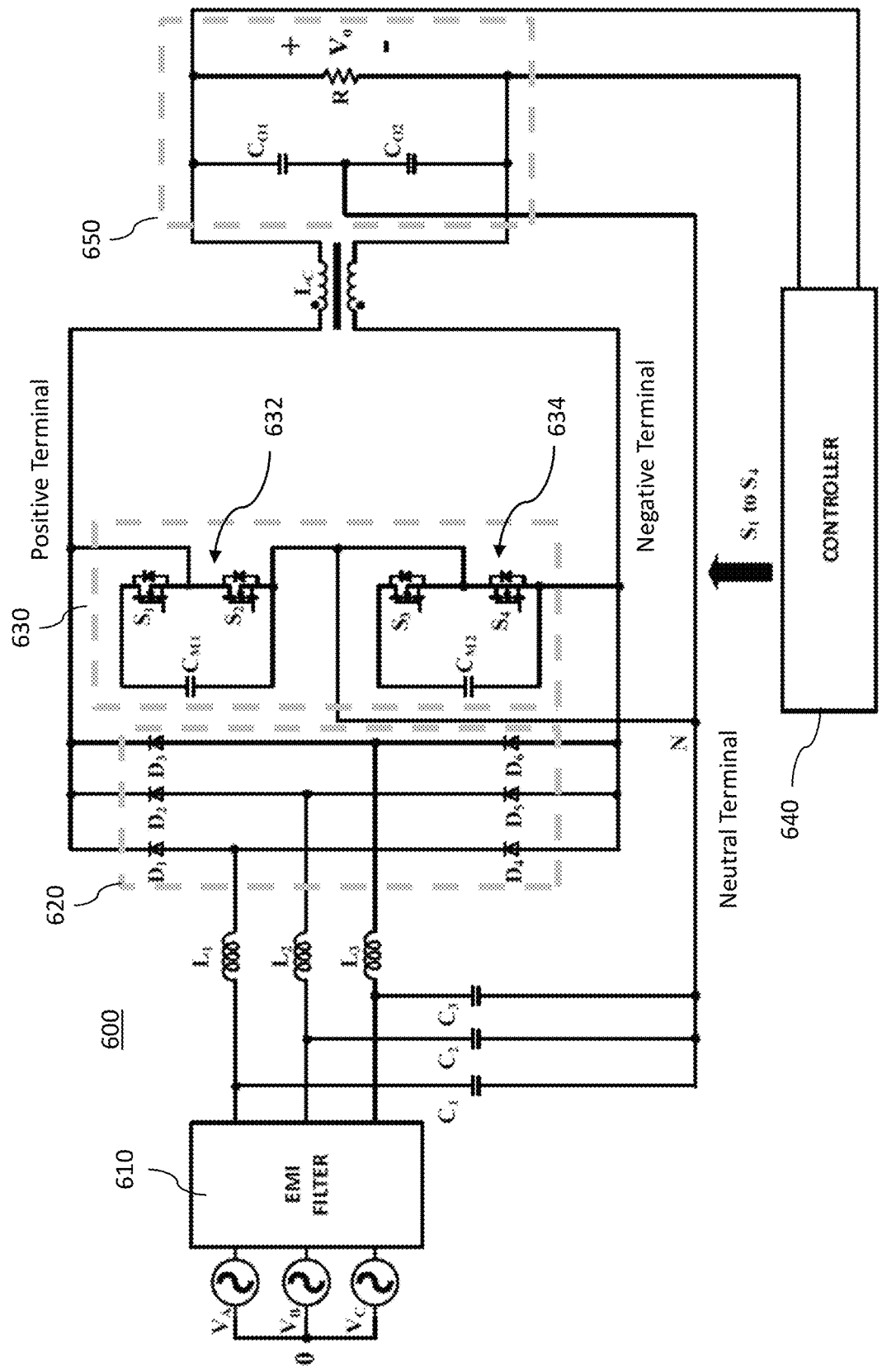
FIG. 6A illustrates a three-phase four-switch ZVS PFC DCM boost rectifier circuit according to an embodiment of the present disclosure.

FIG. 6A shows a three-phase zero voltage switching (ZVS), power-factor-correction (PFC), discontinuous-conduction mode (DCM), low input-current harmonic AC/DC converter 600 (or rectifier circuit 600) according to an embodiment of the present disclosure. Converter 600 includes three boost inductors $L_1$, $L_2$, and $L_3$ coupled through an EMI filter 610 to three-phase input voltage terminals $V_A$, $V_B$, and $V_C$, and three capacitors $C_1$, $C_2$, and $C_3$ connected in the Y or star configuration. Boost inductors $L_1$, $L_2$, and $L_3$ are followed by a three-phase diode bridge 620 and a switching converter stage 630. Switching converter stage 630 includes two half bridge modules 632, 634, wherein each of half bridge module 632, 634 includes two active switches in series ($S_1$ and $S_2$ for half bridge module 632 and $S_3$ and $S_4$ for half bridge module 634) and then coupled with a flying capacitor ($C_{M1}$ for half bridge module 632 and $C_{M2}$ for half bridge module 634). In some embodiments, switches $S_1$, $S_2$, $S_3$, $S_4$ may be a metal-oxide-semiconductor field-effect transistor (MOSFET) or an insulated gate bipolar transistor (IGBT) with an antiparallel diode. Though, any suitable switch may be used.

Figure 6B:
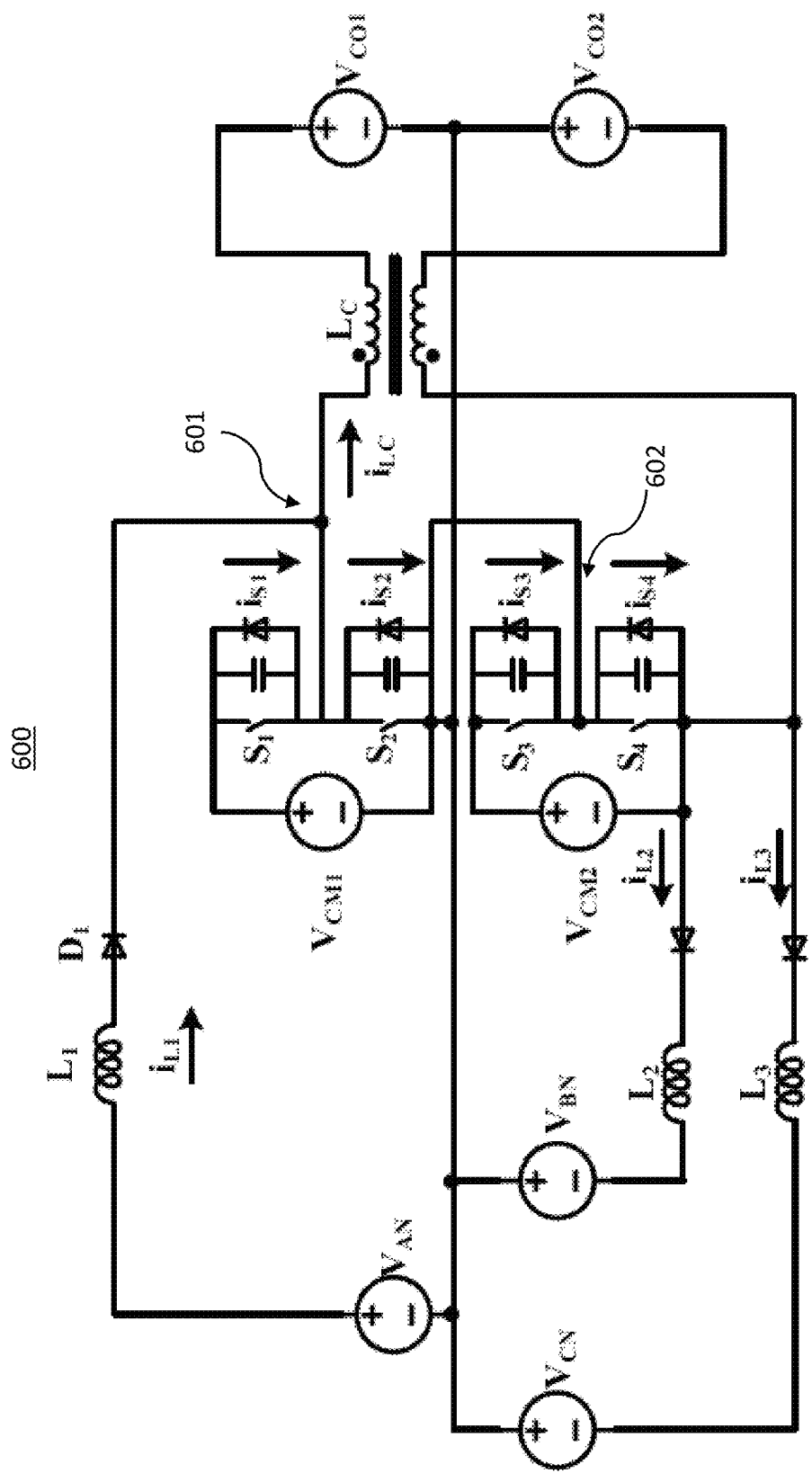
FIG. 6B illustrates a simplified model of the rectifier circuit in FIG. 6A, showing reference directions of currents and voltages, according to an embodiment of the present disclosure.
Figure 6C:
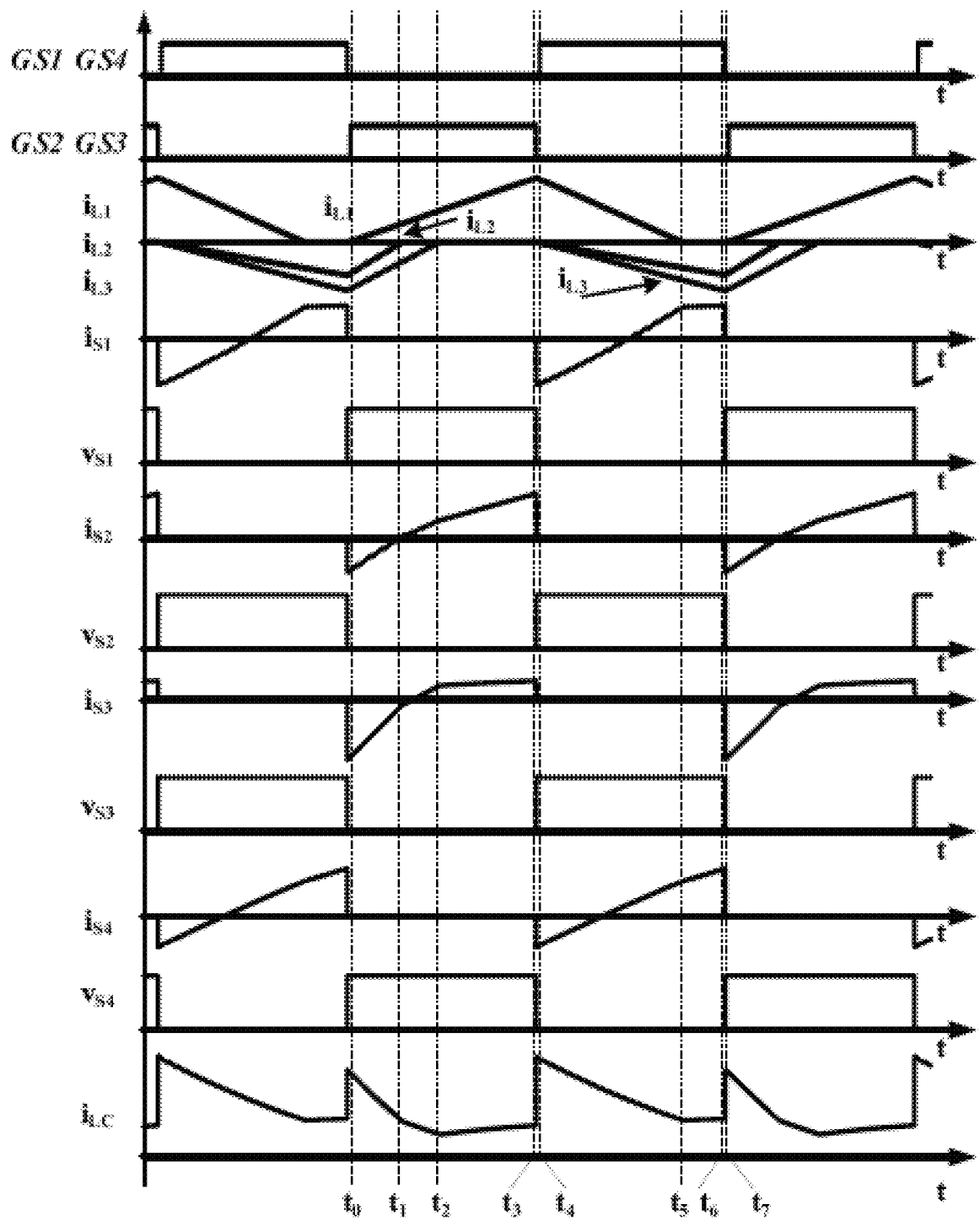
FIG. 6C illustrates key waveforms of the rectifier circuit in FIG. 6A during a switching cycle according to an embodiment of the present invention.
Figure 6D:
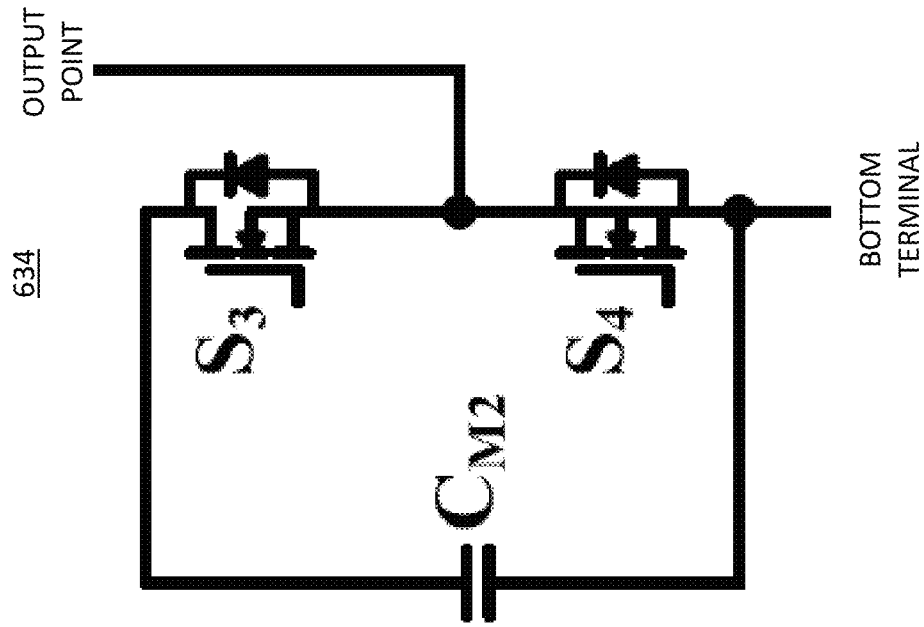
FIG. 6D illustrates an enlarged view of the half bridge modules of the AC/DC converter 600 in FIG. 6A.
Figure 6D:
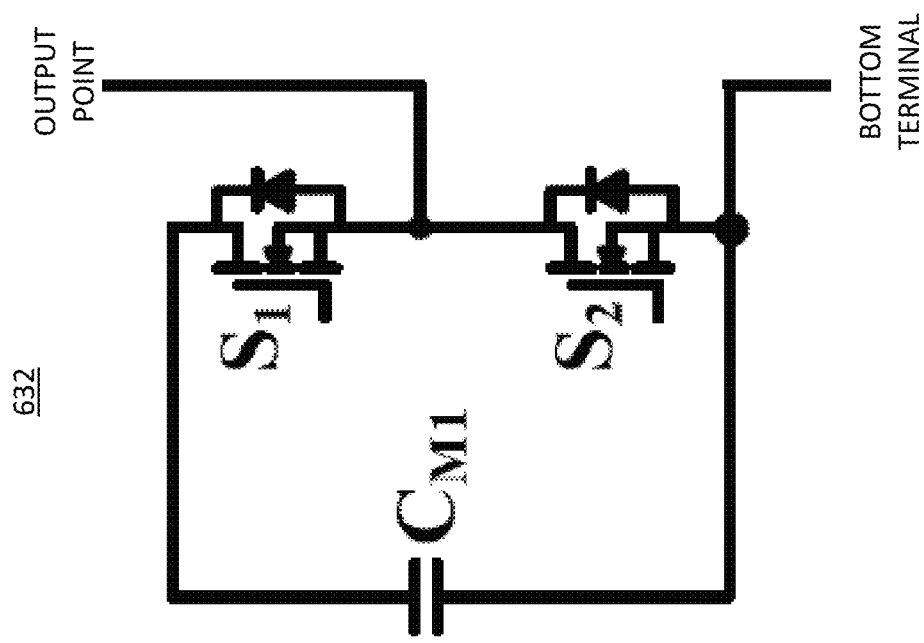

FIG. 6D illustrates an enlarged view of the half bridge modules 632, 634 of the AC/DC converter 600 in FIG. 6A. Referring to both FIGS. 6A and 6D, the output point of half bridge module 632 is connected to the positive terminal of three-phase diode bridge 620 and the bottom terminal of half bridge module 632 is connected to the output point of half bridge module 634. The bottom terminal of half bridge module 634 is connected to the negative terminal of three-phase diode bridge 620. The common point "N" of input filter capacitors $C_1$, $C_2$, and $C_3$ is connected to the bottom terminal of half bridge module 632 and also to the mid-point of split output capacitors $C_{O1}$ and $C_{O2}$. In this embodiment, output filter capacitors $C_{O1}$ and $C_{O2}$ are adapted to couple across a single load R.

The Y-connected capacitors $C_1$, $C_2$, and $C_3$ create a virtual ground, a node with the same voltage potential as the input voltage source neutral common point N, which is not physically available in a three-wire system. This common point N is directly connected to the mid-point between two half bridge modular circuits (i.e., modules 632 and 634), and the three input currents are decoupled with each other. Due to this decoupling, the current in each of the three inductors $L_1$, $L_2$, and $L_3$ is now depended only on the corresponding input phase voltage, which results in low THD and a high power factor.

Converter 600 can further include a controller 640 to provide switching signals to switches $S_1$, $S_2$, $S_3$, $S_4$. The switching signals for switches $S_1$ and $S_4$ are identical and the switching signals for switches $S_2$ and $S_3$ are identical. The switching signals can be fixed at a duty cycle of substantially 50% and the switching signals of the two switches in each of the half bridge modules 632, 634 are complementary. The switching signals may provide a small dead time where each pair of the switches is turned off slightly before the opposite pair is turned on, such that all switches $S_1$, $S_2$, $S_3$, $S_4$ are briefly off during the dead time. When switches $S_1$ and $S_4$ are turned on, it can be seen that common point N is connected to the negative terminal of three-phase diode bridge 620, that switch $S_3$ is blocking the voltage of capacitor $C_{M2}$, and that capacitor $C_{M1}$ becomes the DC-link capacitor. Similarly, when switches $S_2$ and $S_3$ are turned on, it can be seen that common point N is connected to the positive terminal of three-phase diode bridge 620, that switch $S_1$ is blocking the voltage of capacitor $C_{M1}$, and that capacitor $C_{M2}$ becomes the DC-link capacitor. Thus, the capacitor voltage of either capacitor $C_{M1}$ or capacitor $C_{M2}$ is equal to the output voltage and each of switches $S_1$, $S_2$, $S_3$, $S_4$ needs to block the full output voltage in this configuration.

In one embodiment controller 640 can be adapted to vary the switching frequency of switches $S_1$, $S_2$, $S_3$, $S_4$ based on at least one of the following information: the input three-phase voltage, the input three-phase current, the DC-link capacitor voltages, the output voltage, and the output current. Any suitable device may be used to measure the voltages or currents which the controller uses for control (e.g., analog to digital converter, current to voltage converter, etc.). The minimum switching frequency is determined by the full load and minimum input voltage, while the maximum switching frequency is determined by the light load and maximum input voltage. To avoid very high-frequency operation if the AC/DC converter is required to operate at very light load or even no load, a controlled burst mode or pulse skip mode can be implemented. Pulse width modulation control is another possible control scheme in this converter, but realizing ZVS at full load range is not feasible. The switching frequency may be determined by the controller from the sensed values in any suitable way. For example, Ref. [41 describes variable frequency control that may be used in some embodiments.

One challenge of the operation of the circuit shown in FIG. 6A is to balance the voltage of the flying capacitors $C_{M1}$ and $C_{M2}$ of half bridge modules 632, 634. During the operation, the voltages of both capacitors $C_{M1}$ and $C_{M2}$ in half bridge modules 632, 634 are sensed. The controller will change the duty cycle of switches $S_1$, $S_2$, $S_3$, $S_4$ when unbalanced voltage is detected. In order to increase the reliability of converter 600, a relatively larger capacitance is preferred for capacitors $C_{M1}$ and $C_{M2}$ in half bridge modules 632, 634 to make it less likely to suffer voltage imbalance during the operation.

Converter 600 offers a low THD of the input current and a high power factor along with ZVS of the switches by operating the boost inductors in DCM and by implementing the variable-frequency modulation control strategy. In addition, converter 600 exhibits a reduced common-mode noise and is capable of automatic balancing of the split capacitors if serial loads are employed.

In every switching cycle, the voltage of positive and negative terminals of three-phase diode bridge 620 may change rapidly, thus resulting in a high dV/dt value. In one embodiment, inductor $L_C$ is connected between switching converter stage 630 and an output stage 650 to isolate the output from these fast high-voltage transitions to avoid any unacceptable common-mode EMI noise.

FIG. 6B shows a simplified model of converter 600 in FIG. 6A, with reference directions of key currents and voltages presented according to an embodiment of the present disclosure. To simplify the analysis of the operation of the circuit, it is assumed that ripple voltages of input filter capacitors $C_1$, $C_2$, and $C_3$ and output filter capacitors $C_{O1}$ and $C_{O2}$ are negligible so that these voltages can be represented by a constant-voltage source, which are $V_{AN}$, $V_{BN}$, $V_{CN}$, $V_{CO1}$, and $V_{CO2}$. As the average voltage across capacitors $C_{M1}$ and $C_{M2}$ in each of half bridge modules 632, 634 is equal to the output voltage $V_O$ ($V_O = V_{CO1} + V_{CO2}$), capacitors $C_{M1}$ and $C_{M2}$ in half bridge modules 632, 634 are modeled as constant voltages $V_{CM1}$, $V_{CM2}$. The semiconductors in the circuit are assumed to be ideal switches with zero on-state resistance. But the output capacitors are shown to illustrate the transient during switching. Finally, the coupled inductor $L_C$ is modeled as an ideal transformer to simplify the analysis.

FIG. 6C shows the key waveforms during a switching cycle of the power stage according to an embodiment of the present disclosure. The reference directions of currents and voltages in FIG. 6C correspond to the 60-degree segments of a line cycle when $V_{AN} > 0$, $V_{BN} < 0$, and $V_{CN} < 0$. As can be seen from the gate-driving time diagrams of switches $S_1$ to $S_4$ in FIG. 6C, switches $S_1$ and $S_2$ operate in a complementary fashion with a short dead time (e.g., $t_4$ to $t_3$) between the turn-on of one switch and turn-off of the other switch. Switches $S_1$ and $S_4$ have identical gate-driving signals while switches $S_2$ and $S_3$ have identical gate-driving signals.

At $t=t_0$, switches $S_2$ and $S_3$ are turned on at the same time with zero voltage due to the gating strategy. The voltage across $L_1$ becomes $V_{AN}$, which is the line-to-neutral voltage of phase A. The $L_1$ current $i_{L1}$ starts to increase by the rate of $V_{AN}/L_1$. Current $i_{L1}$ keeps increasing from $t_0$ to $t_3$ until switches $S_2$ and $S_3$ are turned off. The peak of inductor current $i_{L1}$ occurs at $t_3$, which is approximately $$i_{L1,pk} = \frac{V_{AN}}{L_1} \times \frac{T_S}{2} \qquad (1)$$

where Ts is the switching period. The voltage across $L_2$ is $V_{BN} + V_{CM2}$ and the voltage across $L_3$ is $V_{CN} + V_{CM2}$, which are positive even $V_{BN}$ and $V_{CN}$ are negative. Currents $i_{L2}$ and $i_{L3}$ of inductors $L_2$ and $L_3$ keep increasing by the rate of $(V_{BN}+V_{CM2})/L_2$ and $(V_{CN}+V_{CM2})/L_2$, respectively. Switches $S_2$ and $S_3$ are conducting negative currents. Applying Kirchhoff's current law at node 601, equation (2) can be derived.

$$i_{L1} = i_{LC} + i_{S2} \qquad (2)$$

Note that the current is. (n=1, 2, 3, or 4) is the current through a respective modeled switch. That is, it is the sum of the currents through the ideal switch and the respective parallel capacitor and diode.

Because $i_{L1}$ is almost zero at t=0, $1S_2$ is then equal to the negative of $i_{LC}$. It should also be noted that $i_{S2}$ is less than $i_{L1}$ due to the positive $i_{LC}$, so that the switches in converter 600 exhibit reduced power losses. Similarly, applying Kirchhoff's current law at node 602, equation (3) can be obtained.

$$i_{L2} + i_{L3} + i_{LC} = i_{S3} \qquad (3)$$

During time interval $t_0$ to $t_1$, both $i^{S2}$ and $i_{S3}$ increase while current $i_{LC}$ decreases.

At $t=t_1$, current $i_{L2}$ increases to zero and will maintain zero until the end of the half switching period. After current $i_{L2}$ becomes to zero, the increasing slope of $i_{S2}$ and $i_{S3}$ decrease and the decreasing slope of current $i_{LC}$ also decreases at $t=t_1$.

At $t=t_2$, current $i_{L3}$ increases to zero and will maintain zero until the end of the half switching period. After $i_{L3}$ becomes zero, the increasing slope of $i_{S2}$ and $i_{S3}$ further decreases.

The current of switch $S_3$ is now equal to current $i_{LC}$ and capacitor $C_{M2}$ continues to provide energy to the load.

At $t=t_3$, switches $S_2$ and $S_3$ are turned off. Part of the inductor current $i_{L1}$ charges the output capacitor of switch $S_2$ and discharges the output capacitor of switch Si. Once the voltage of output capacitor of switch $S_2$ is clamped to the voltage of capacitor $C_{M1}$, the antiparallel diode of switch $S_1$ starts to conduct current. Similarly, when the voltage of output capacitor of switch $S_3$ is clamped to the voltage of capacitor $C_{M2}$, the antiparallel diode of switch $S_4$ starts to conduct current. Current $i_{L1}$ reaches its peak value at $t=t_3$ and starts to decrease thereafter.

At $t=t_4$, switches $S_1$ and $S_4$ are turned on with ZVS. The voltage across inductor $L_1$ is equal to the input voltage minus the voltage of capacitor $C_{M1}$. Current $i_{L1}$ decreases with the rate of $(V_{AN}-V_{CM1})/L_1$. The voltage across inductor $L_2$ becomes $V_{BN}$ and the voltage across inductor $L_3$ becomes $V_{CN}$. Therefore, currents $i_{L2}$ and $i_{L3}$ start to decrease by the rate of $V_{BN}/L_2$ and $V_{CN}/L_3$, respectively. Applying Kirchhoff's current law respectively at nodes 601 and 602, equations (4) and (5) can be found.

$$i_{L1} = i_{LC} - i_{S1} \quad (4)$$

$$i_{L2} + i_{L3} + i_{LC} = -1_{S4} \quad (5)$$

At $t=t_5$, current $i_{L1}$ decreases to zero and will maintain zero until the end of this switching period. In order to operate in DCM, the decreasing slope of current $i_{L1}$ from $t_3$ to $t_5$ should be greater than the increasing slope of current $i_{L1}$ from $t_3$ to $t_5$. In other words, voltage difference $V_{CM1}-V_{AN}$ should always be greater than voltage $V_{AN}$, where $V_{CM1}=V_{CM2}=V_O$. Accordingly, the minimum output voltage can be derived using equation (6).

$$V_{O,MIN} = 2V_{AN,PK} = \frac{2\sqrt{2}}{\sqrt{3}} \times V_{L-L,RMS} \quad (6)$$

where $V_{AN,PK}$ is the peak line-to-neutral voltage and $V_{L-L,RMS}$ is the line-to-line RMS voltage.

At $t=t_6$, switches $S_1$ and $S_4$ are turned off. Inductor currents $i_{L2}$ and $i_{L3}$ reach their peak value and can be expressed as $$i_{L2,pk} = \frac{V_{BN}}{L_2} \times \frac{T_S}{2} \quad (7)$$

$$i_{L3,pk} = \frac{V_{CN}}{L_2} \times \frac{T_S}{2} \quad (8)$$

The peak value of each inductor current is proportional to its corresponding input voltage in each phase.

Finally, when switches $S_2$ and $S_3$ are turned on at $t=t_7$, a new switching cycle begins.

It should be noted that the inductor current starts from zero, and reduces back to zero in one switching period and the average inductor current $\langle I_{L,AVG}\rangle_{TS}$ of each inductor during a specific switching period can be calculated as $$\langle i_{L,AVG}\rangle_{TS} = \frac{T_S}{8L} \times V_N \times \frac{V_O}{V_O - V_N} \quad (9)$$

where $L=L_1=L_2=L_3$, and $V_N$ is the corresponding line-to-neutral voltage.

Figure 7A:
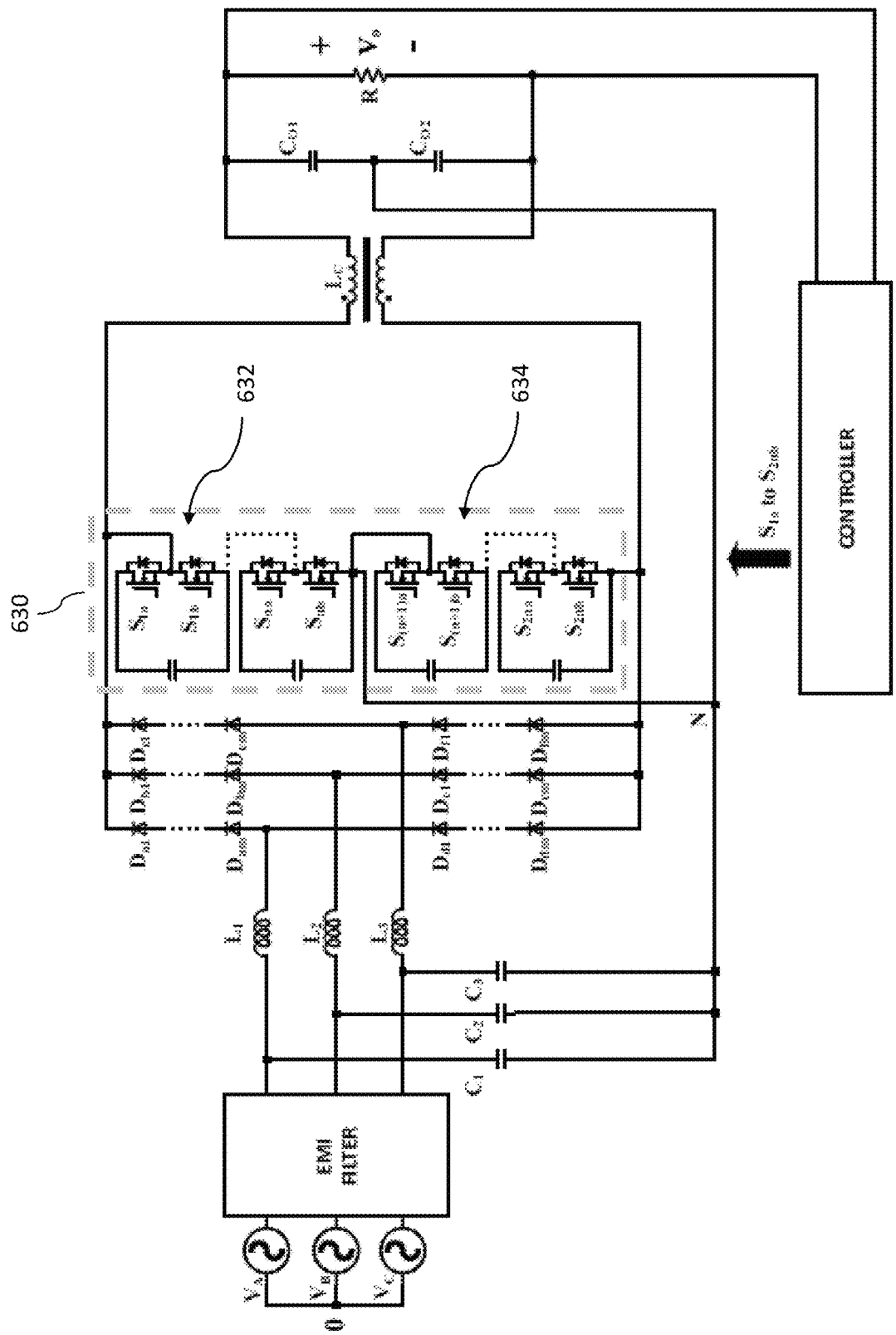
FIG. 7A illustrates a generalized three-phase ZVS PFC DCM boost rectifier circuit based on total 6m (m=1, 2, 3, . . . ) diodes and 2n (n=1, 2, 3, . . . ) half bridge modules according to an embodiment of the present disclosure.

The circuit described in connection with FIG. 6A can be further implemented in many other embodiments. For example, FIG. 7A shows an implementation in high voltage applications. As shown in FIG. 7A, each diode in the three-phase diode bridge 620 in FIG. 6A is replaced by m diodes connected in series to block the high input voltage. Passive snubber circuit may be required to balance the blocking voltage for each diode.

In the switching converting stage 630, a total of 2n half bridge modules are implemented. The middle point of every half bridge module is connected to the bottom terminal of the previous half bridge module ("cascaded"). The middle point of the first half bridge module in connected to the positive terminal of the three-phase diode bridge and the bottom terminal of the last half bridge module is connected to the negative terminal of the three-phase diode bridge. The common point N of the input filter capacitors is connected to the mid-point between the upper n and the lower n half bridge modular circuits, and also to the mid-point of split output capacitors $C_{O1}$ and $C_{O2}$.

Figure 7B:
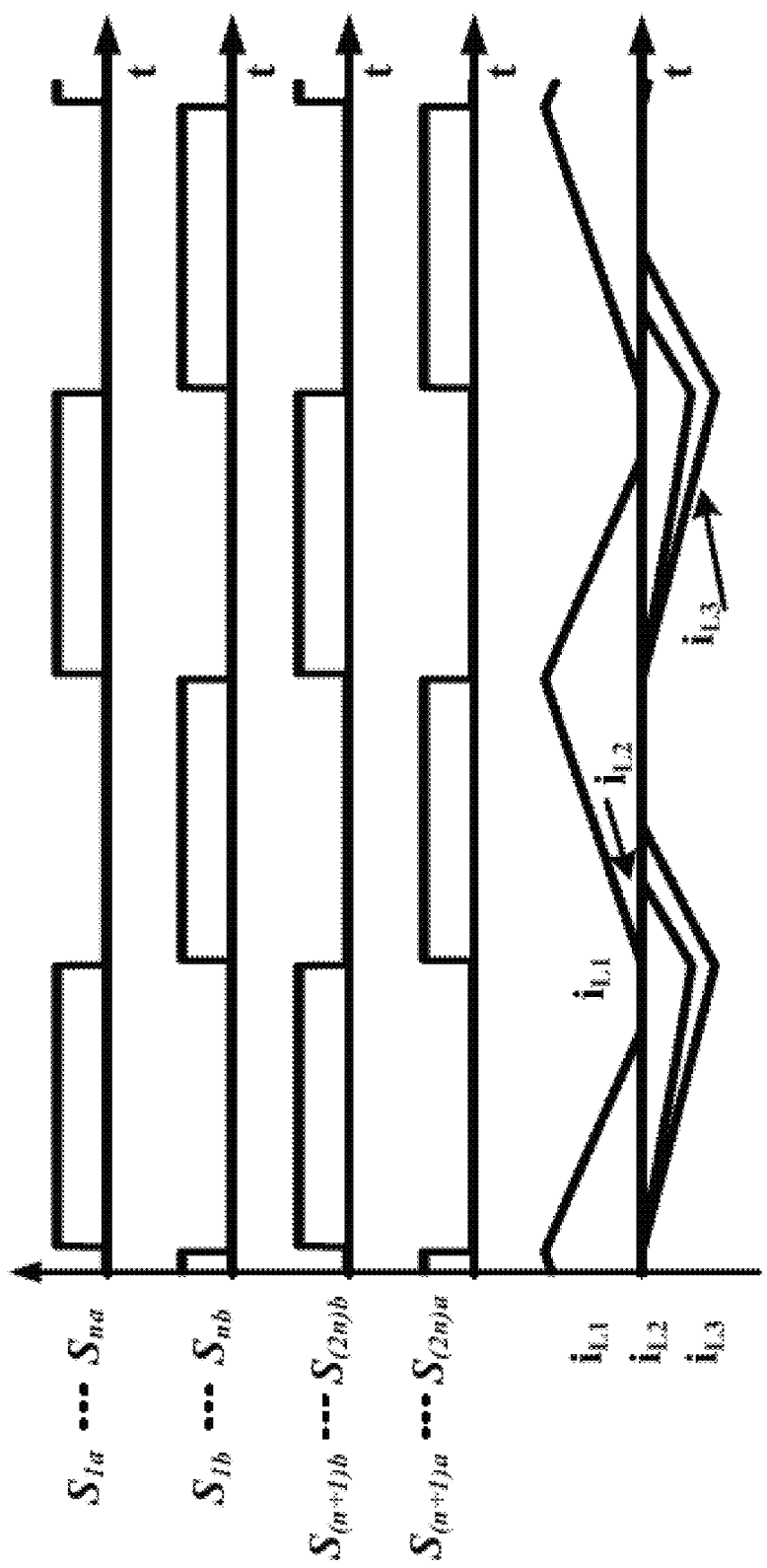
FIG. 7B illustrates key waveforms of the rectifier circuit in FIG. 7A during a switching cycle according to an embodiment of the present disclosure.

FIG. 7B shows the switches signals of all active switches. The control signals of switches $S_{1a}$, $S_{2a}$ to $S_{na}$ are identical to the control signals of signals $S_{(n+1)b}$, $S_{(n+2)b}$ to $S_{2nb}$, which are fixed at a duty cycle of substantially 50%. The control signals of switches $S_{1b}$, $S_{2b}$ to $S_{nb}$ are identical to the control signals of switches $S_{(n+1)a}$ to $S_{2na}$, which are also fixed at a duty cycle of substantially 50%. The control signals of the two switches of each half bridge module are complementary. In other words, the top switch of each half bridge module in the top half leg and the bottom switch of each half bridge module in the bottom half leg are turned on and off simultaneously. The bottom switch of each half bridge module in the top half leg and the top switch of each half bridge module in the bottom half leg are turned on and off simultaneously. It can be seen that when the top switch of each half bridge module on the top half leg and the bottom switch of each half bridge module on the bottom half leg are turned on, the common point N is connected to the negative terminal of the three-phase diode bridge. Similarly, the common point N is connected to the positive terminal of the three-phase diode bridge when bottom switch of each half bridge module on the top half leg and the top switch of each half bridge module on the bottom half leg are turned on.

When the top switch of each half bridge module in the top half leg and the bottom switch of each half bridge module in the bottom half leg are on, the capacitors in each half bridge module in the top half leg are connected in series to become the DC-link capacitors. When the bottom switch of each half bridge module in the top half leg and the top switch of each half bridge module in the bottom half leg are on, the capacitors in each half bridge module in the bottom half leg are connected in series to become the DC-link capacitors. As the voltage of the DC-link capacitors is equal to the output voltage, voltage of each capacitor in each half bridge module is only 1/n of the total output voltage and each switch only needs to block 1/n of the total output voltage, which makes it possible to use the low voltage switches in very high input and output voltage applications.

During the operation, the voltages of all capacitors in half bridge modules may be sensed. The center controller will change the duty cycle of the switches when voltage unbalance is detected. In order to increase the reliability of the system, a relatively larger capacitance is preferred in the half bridge module to make it less likely to suffer voltage imbalance during the operation.

Figure 8:
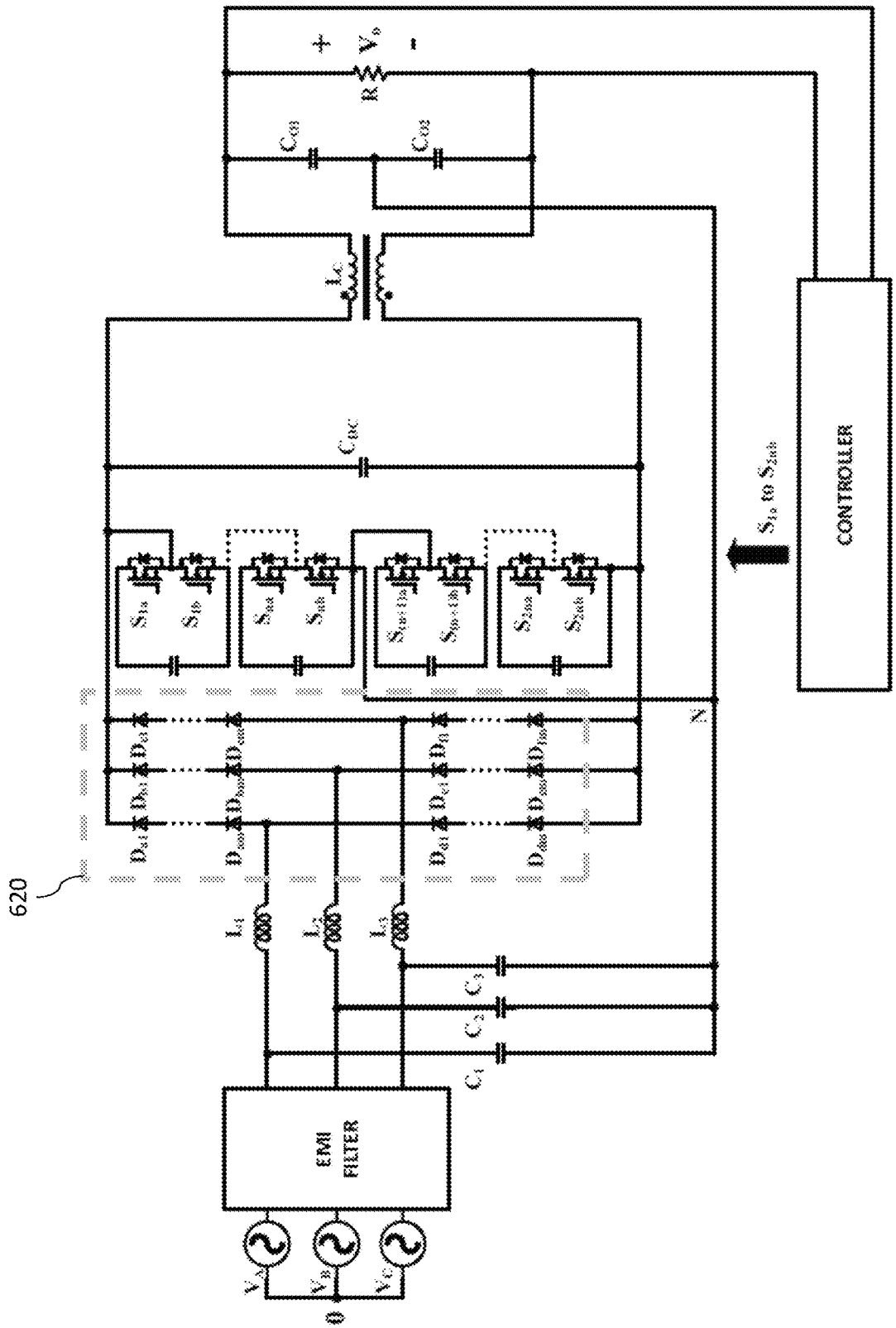
FIG. 8 illustrates a generalized three-phase ZVS PFC DCM boost rectifier circuit with additional DC-link capacitors based on total 6m (m=1, 2, 3, . . . ) diodes and 2n (n=1, 2, 3, . . . ) half bridge modules according to an embodiment of the present disclosure.

FIG. 8 shows an implementation with an additional DC-link capacitor CDC according to an embodiment of the present disclosure. DC-link capacitor CDC is coupled between the output positive and negative terminals of the three-phase diode bridge 620. This capacitor will provide a DC-link voltage in addition to the voltages of the capacitors in half bridge modules.

Figure 9A:
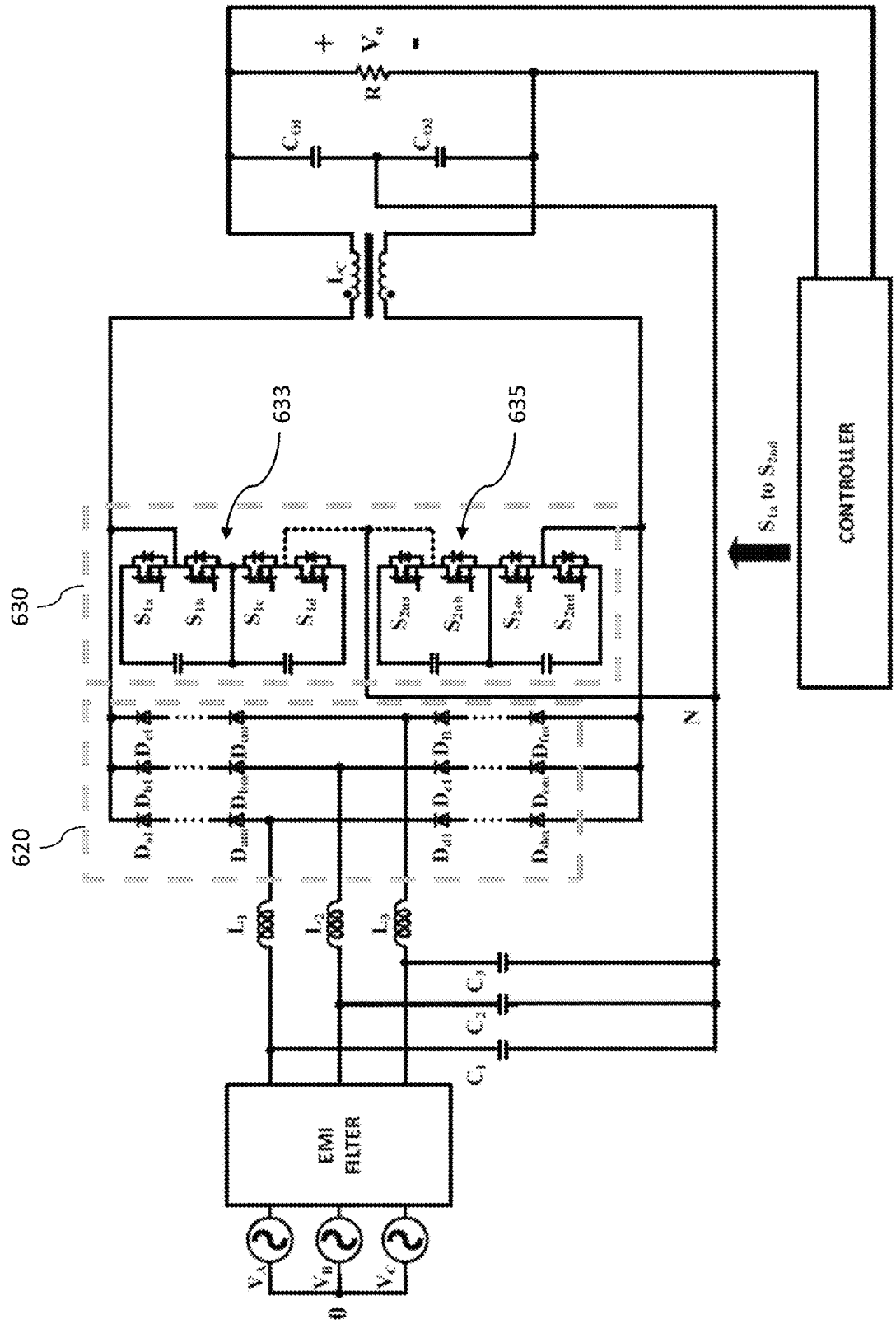
FIG. 9A illustrates a generalized three-phase ZVS PFC DCM boost rectifier circuit based on total 6m (m=1, 2, 3, . . . ) diodes and 2n (n=1, 2, 3, . . . ) serial-half-bridge modules according to an embodiment of the present disclosure.
Figure 9B:
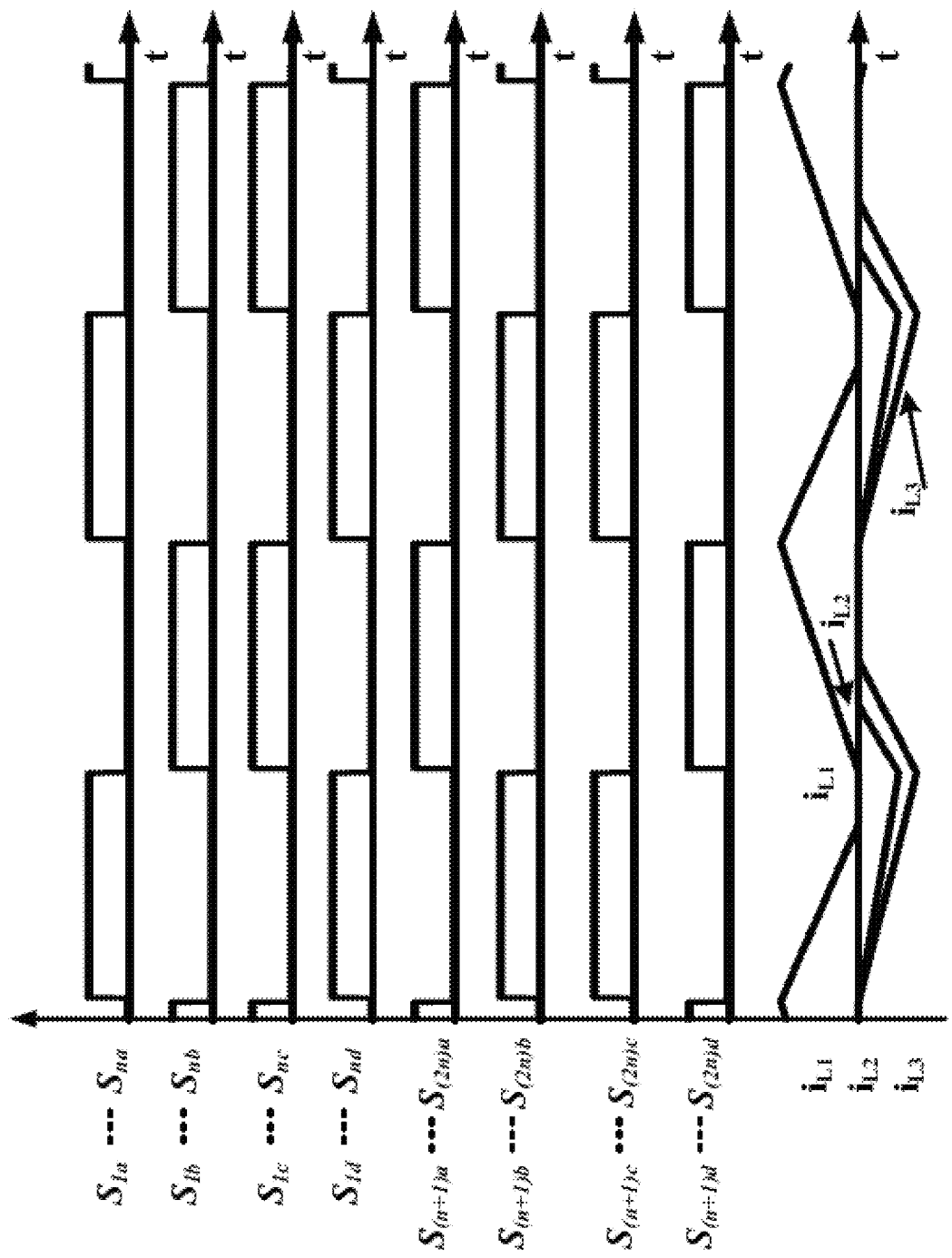
FIG. 9B illustrates key waveforms of rectifier circuit in FIG. 9A during a switching cycle according to an embodiment of the present disclosure.
Figure 9C:
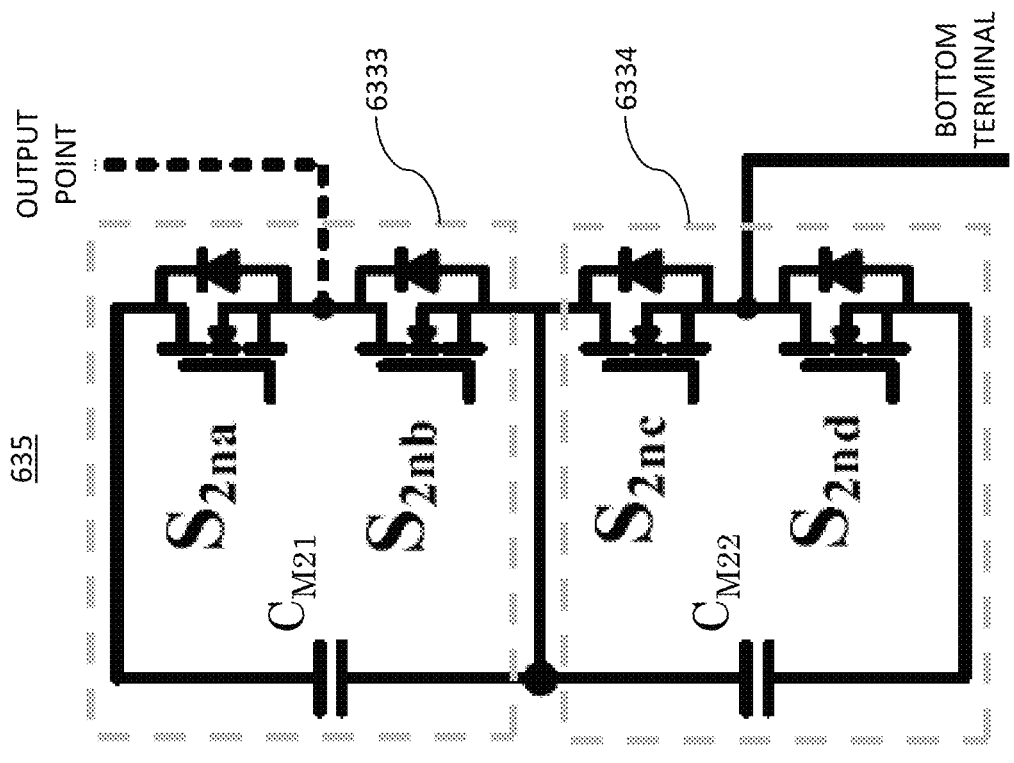
FIG. 9C illustrates an enlarged view of the serial-half-bridge modules as shown in FIG. 9A.
Figure 9C:
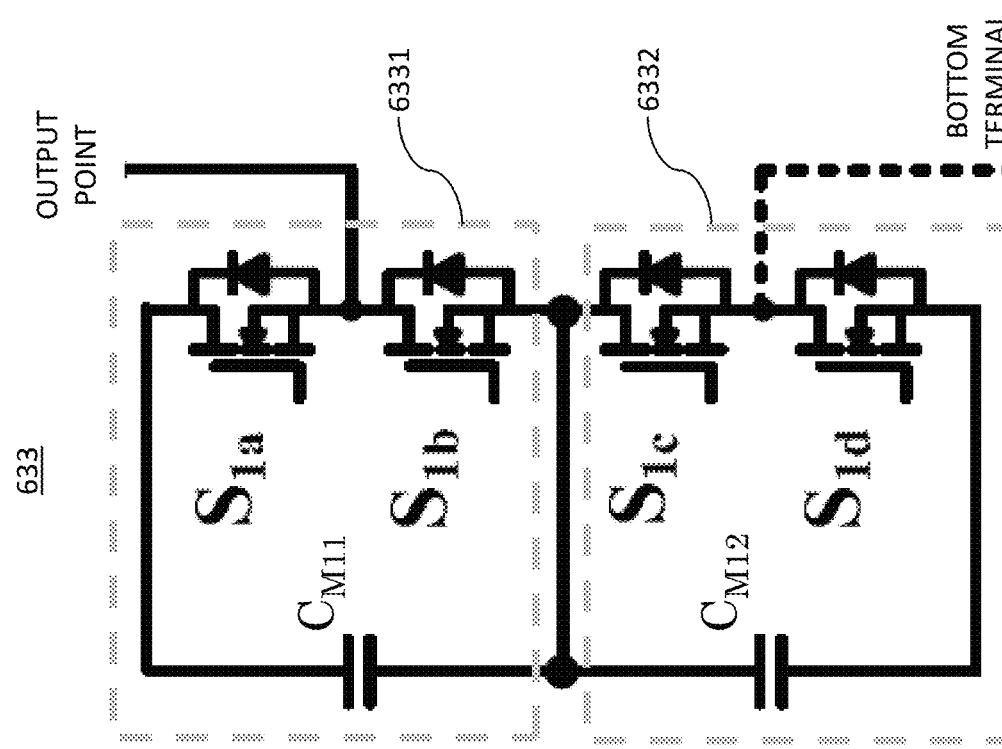

FIG. 9A shows an implementation of switching converter stage 630 using serial-half-bridge modules 633, 635 according to an embodiment of the present disclosure. FIG. 9B shows the control signals of all active switches $S_{1a} \ldots S_{na}$, $S_{1b} \ldots S_{nb}$, $S_{1c} \ldots S_{nc}$, $S_{1d} \ldots S_{nd}$, $S_{(n+1)a} \ldots S_{(2n)a}$, $S_{(n+1)b} \ldots S_{(2n)b}$, $S_{(N+1)c} \ldots S_{(2n)c}$, $S_{(n+1)d} \ldots S_{(2n)d}$ in detail. FIG. 9C shows an enlarged view of the serial-half-bridge modules 633, 635 as shown in FIG. 9A.

Referring to both FIGS. 9A and 9C, in this embodiment, two half bridge modules are connected in series (or "paired") to become the basic module (namely, serial-half-bridge modules 633, 635). Serial-half-bridge module 633 includes a first half bridge 6331 and a second half bridge 6332. First half bridge 6331 includes two switches $S_{1a}$, $S_{1b}$ and a capacitor $C_{M11}$, which are connected in series in a loop. The connecting point between switches $S_{1a}$, $S_{1b}$ defines an output point of serial-half-bridge modules 633, while the connecting point between switch Sib and capacitor $C_{M11}$ defines a bottom terminal of first half bridge 6331. Second half bridge 6332 includes two switches $S_{1c}$, $S_{1d}$ and a capacitor $C_{M12}$, which are connected in series in a loop. The connecting point between switches $S_{1c}$ and capacitor $C_{M12}$ defines a top terminal of the second half bridge 6332, while the connecting point between switches Sic, Sid defines a bottom terminal of serial-half-bridge modules 633. As shown in FIG. 9C, first half bridge 6331 and second half bridge 6332 are connected in series (or "paired") by connecting the bottom terminal of first half bridge 6331 and the top terminal of the second half bridge 6332 so as to form serial-half-bridge module 633.

Likewise, serial-half-bridge module 634 includes a first half bridge 6333 and a second half bridge 6334. First half bridge 6333 includes two switches $S_{2na}$, $S_{2nb}$ and a capacitor $C_{M21}$, which are connected in series in a loop. The connecting point between switches $S_{2na}$, $S_{2nb}$ defines an output point of serial-half-bridge modules 634, while the connecting point between switch $S_{2nb}$ and capacitor $C_{M21}$ defines a bottom terminal of first half bridge 6333. Second half bridge 6334 includes two switches $S_{2nc}$, $S_{2nd}$ and a capacitor $C_{M22}$, which are connected in series in a loop. The connecting point between switches $S_{2nc}$ and capacitor $C_{M22}$ defines a top terminal of the second half bridge 6332, while the connecting point between switches $S_{2ne}$, $S_{2nd}$ defines a bottom terminal of serial-half-bridge modules 634. As shown in FIG. 9C, first half bridge 6333 and second half bridge 6334 are connected in series (or "paired") by connecting the bottom terminal of first half bridge 6333 and the top terminal of the second half bridge 6334 so as to form serial-half-bridge module 634.

As shown in FIGS. 9A and 9C, the output point of serial-half-bridge module 633 is connected to the positive terminal of three-phase diode bridge 620. The bottom terminal of serial-half-bridge module 633 is connected to the output point of serial-half-bridge module 635, while the bottom terminal of serial-half-bridge module 635 is connected to the negative terminal of three-phase diode bridge 620. In the implementation where multiple serial-half-bridge modules are used (e.g., 2n serial-half-bridge modules, where n is a positive integer greater than 2), a bottom terminal of each serial half bride module is connected to the output point of the following serial-half-bridge module. All the switches are operated with a fixed duty cycle of substantially 50%. The control signals of the two switches of each half bridge are complementary.

Figure 10:
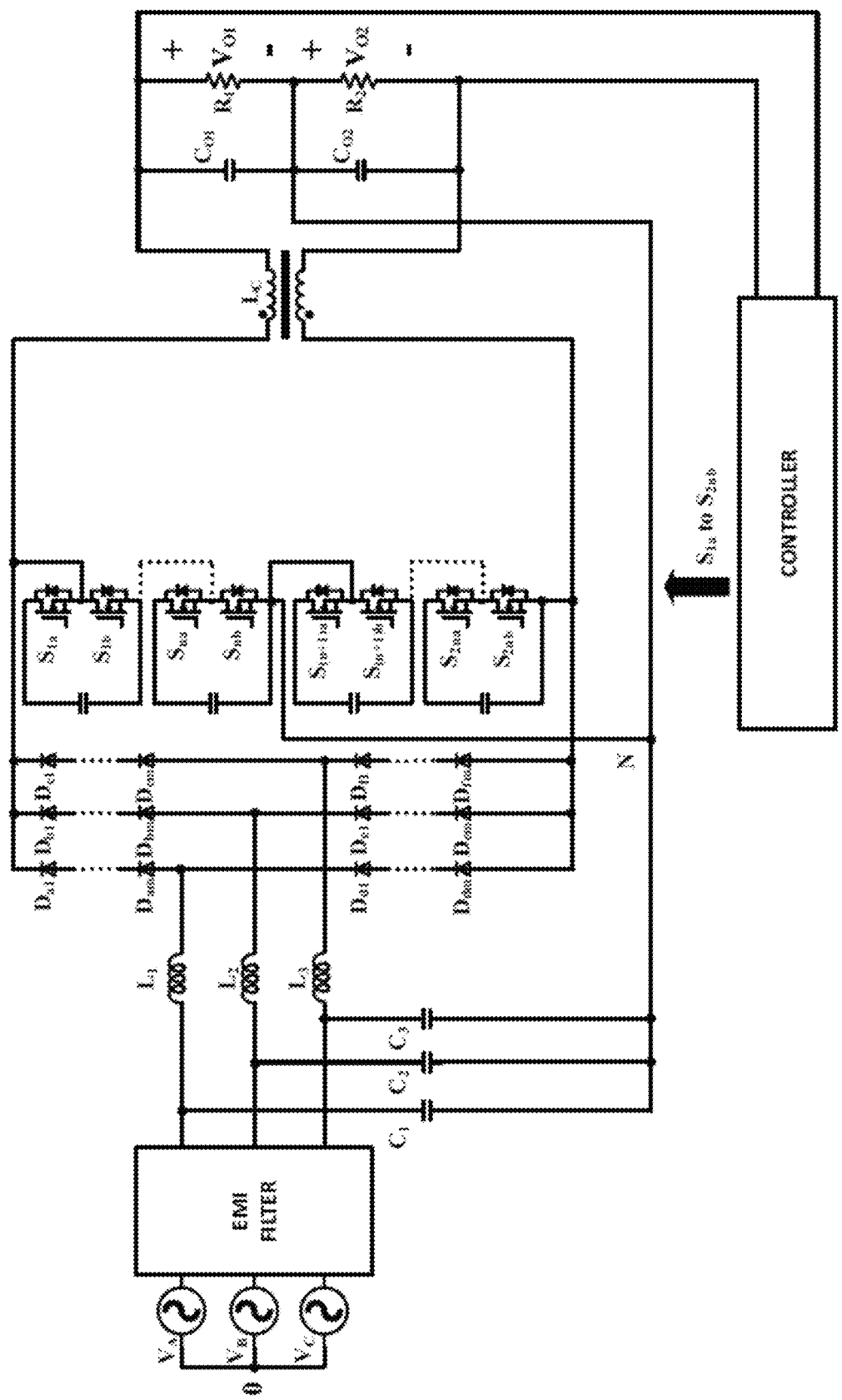
FIG. 10 illustrates a generalized three-phase ZVS PFC DCM boost rectifier circuit with two independent loads according to an embodiment of the present disclosure.

FIG. 10 shows an implementation with two independent loads $R_1$ and $R_2$ according to an embodiment of the present disclosure. Because the proposed AC/DC converter is capable of automatically balancing the voltages across the two output capacitors $C_{O1}$ and $C_{O2}$, no extra balancing circuit or controller is required.

Figure 11:
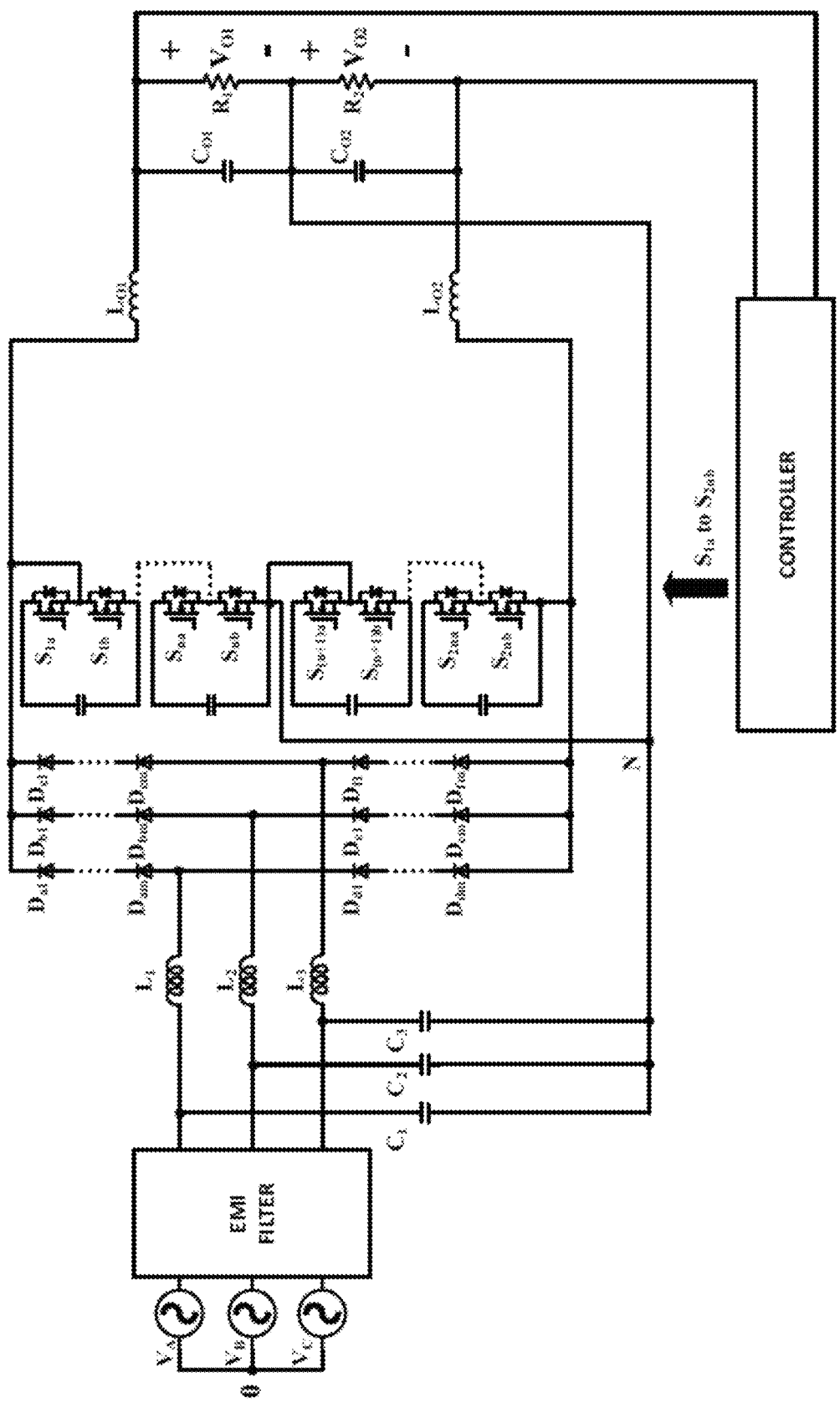
FIG. 11 illustrates a generalized three-phase ZVS PFC DCM boost rectifier circuit with two independent inductors and two independent loads according to an embodiment of the present disclosure.

FIG. 11 shows an implementation with two independent inductors $L_{O1}$ and $L_{O2}$ according to an embodiment of the present disclosure. These two independent inductors $L_{O1}$ and $L_{O2}$ replace the coupled inductor $L_C$ in FIG. 10.

Figure 12:
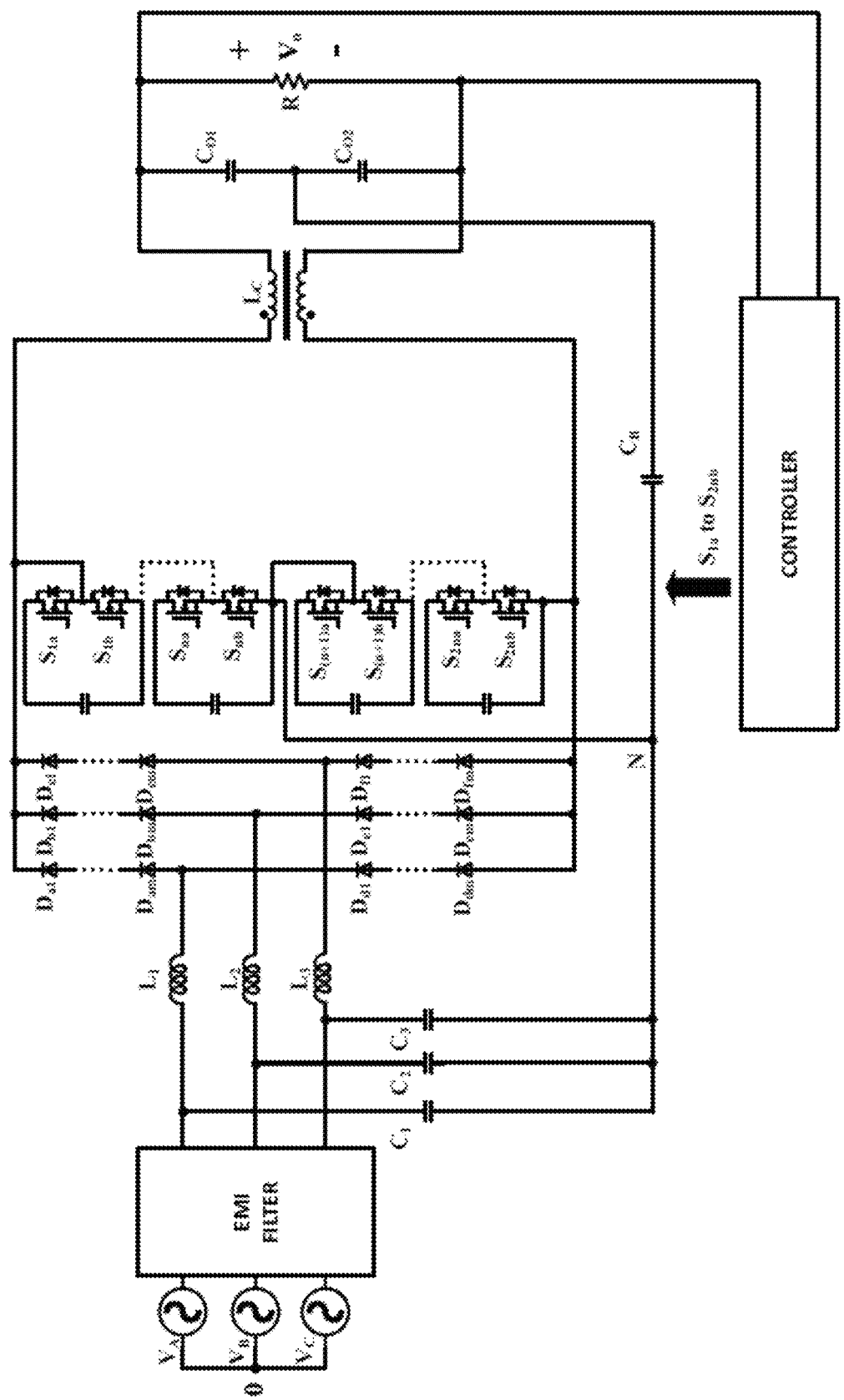
FIG. 12 illustrates a generalized three-phase ZVS PFC DCM boost rectifier circuit with a blocking capacitor between the virtual neutral and the midpoint of the two split output capacitors according to an embodiment of the present disclosure.

FIG. 12 shows an implementation with an additional blocking capacitor $C_B$ according to an embodiment of the present disclosure. The blocking capacitor $C_B$ is placed between the neutral node N of the input capacitors $C_1$, $C_2$, and $C_3$, and the mid-point of the output capacitors $C_{O1}$ and $C_{O2}$. This blocking capacitor $C_B$ prevents any DC current circulating between the neutral node N and the output capacitors $C_{O1}$ and $C_{O2}$.

Figure 13:
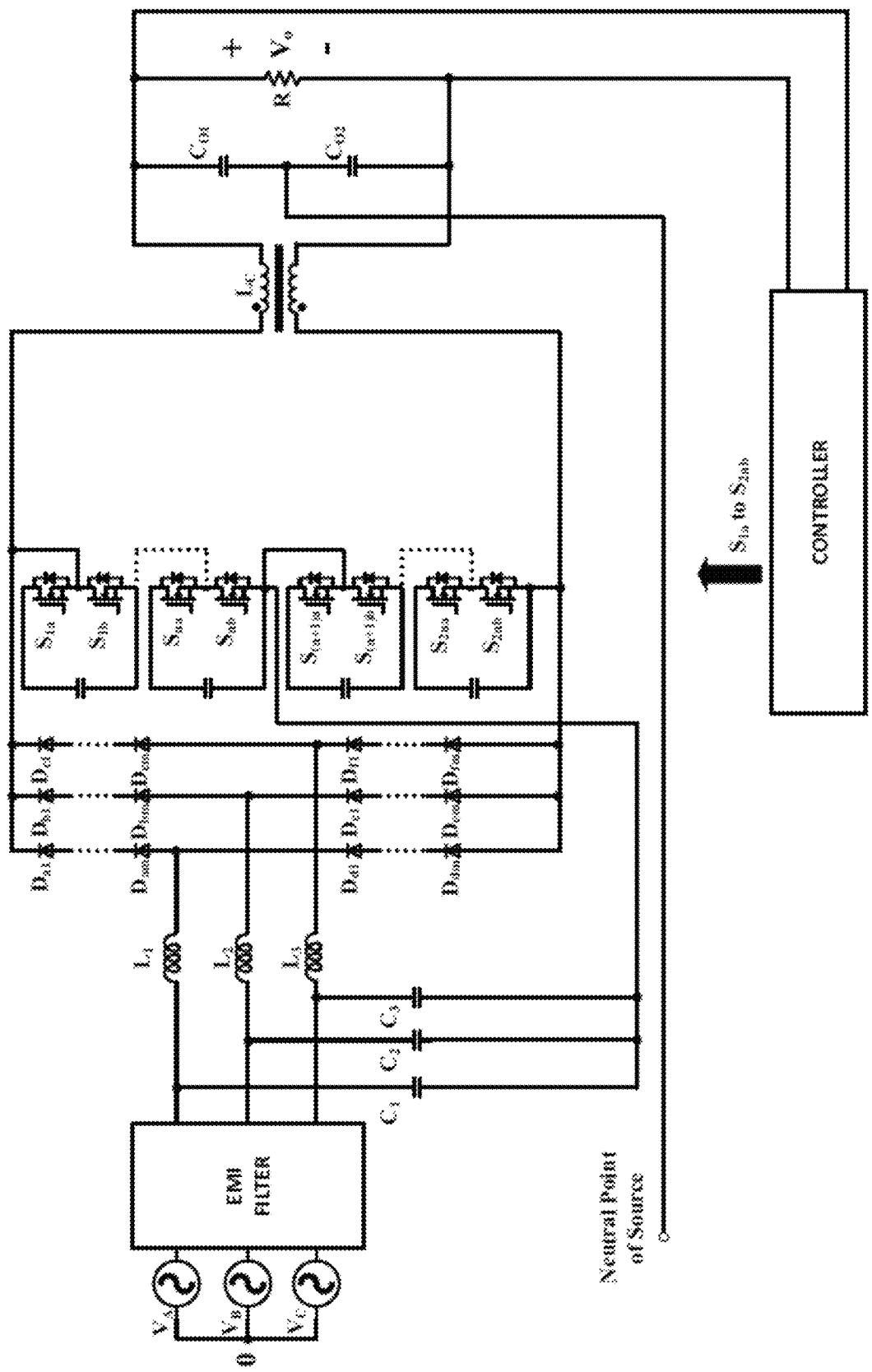
FIG. 13 illustrates a generalized three-phase ZVS PFC DCM boost rectifier circuit with a coupling between the input source neutral and the midpoint of the two split output capacitors according to an embodiment of the present disclosure.

FIG. 13 shows an implementation in three-phase four-wire system according to an embodiment of the present disclosure. The mid-point between output capacitors $C_{O1}$ and $C_{O2}$ is connected to the real neutral wire of the input source.

Figure 14:
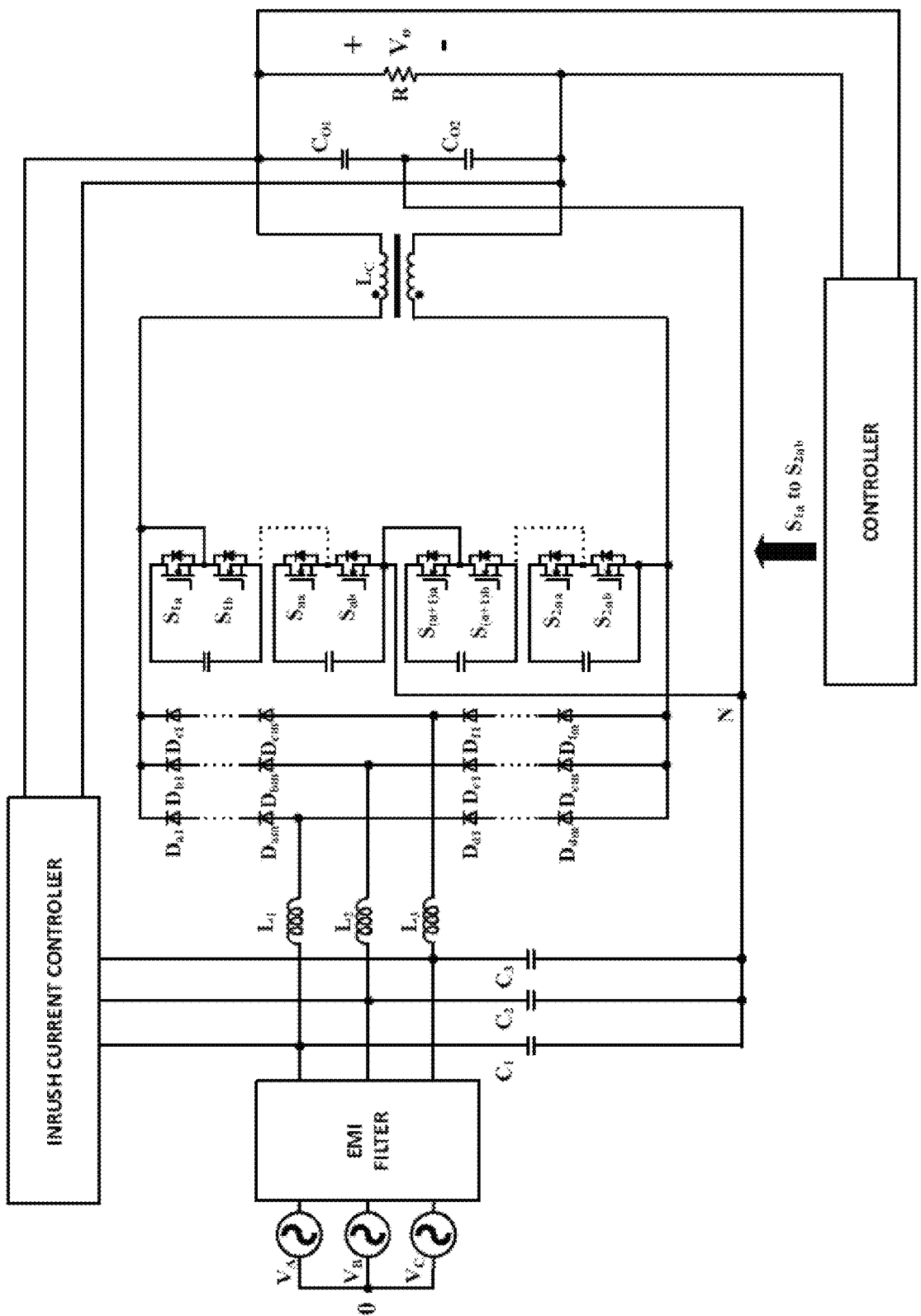
FIG. 14 illustrates a generalized three-phase ZVS PFC DCM boost rectifier circuit with an inrush current controller according to an embodiment of the present disclosure.

FIG. 14 shows an implementation with an inrush current controller according to an embodiment of the present disclosure. The inrush current controller circuit can prevent and/or bypass any high spike current when the AC/DC converter is connected to the input source. The inrush current controller circuit may be coupled between the input source and the input capacitors $C_1$, $C_2$, and $C_3$. The output voltage value may be sensed and used for this controller.

Figure 15:
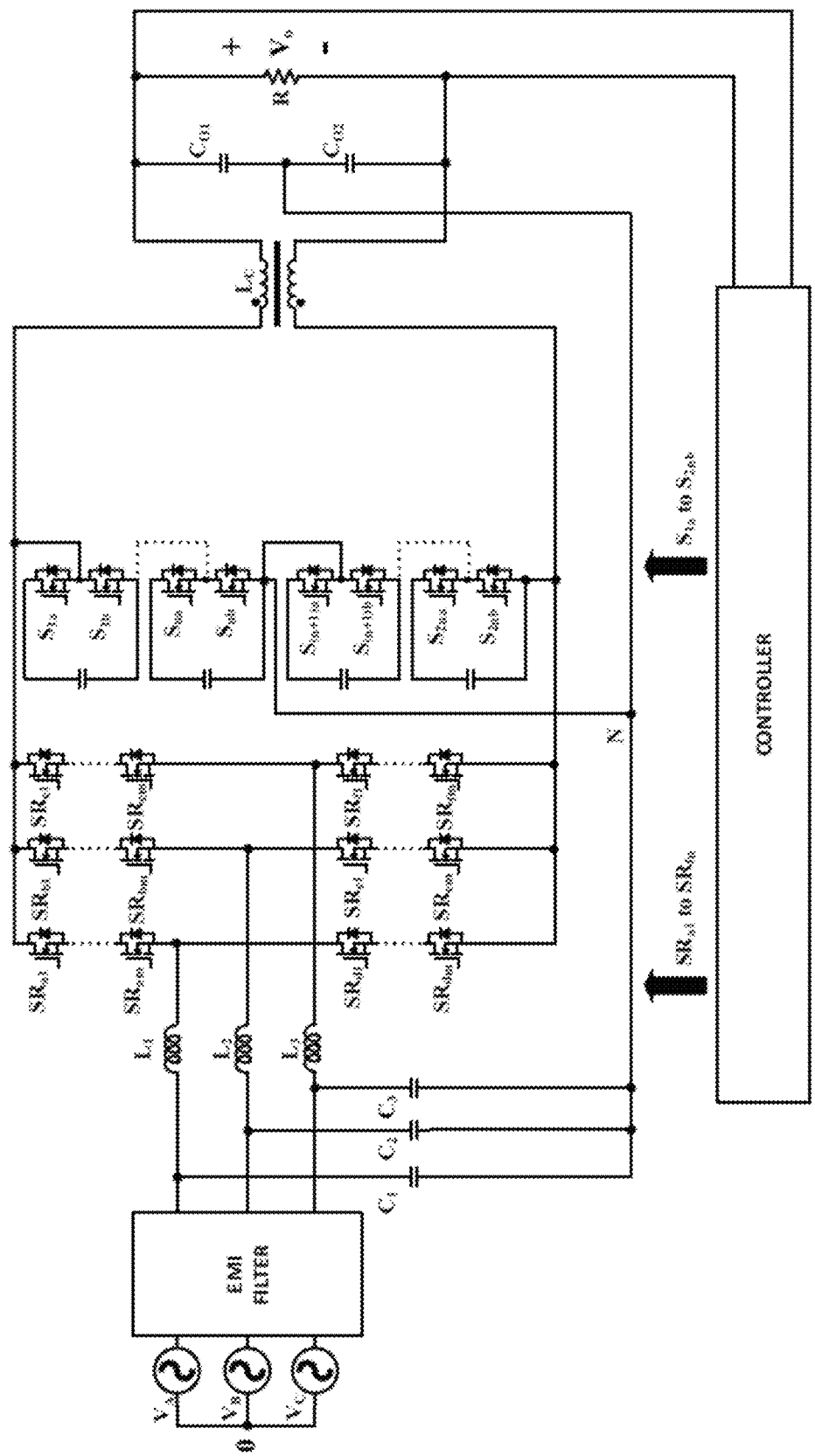
FIG. 15 illustrates a generalized three-phase ZVS PFC DCM boost rectifier circuit where the input bridge rectifier includes controlled switches according to an embodiment of the present disclosure.

FIG. 15 shows an implementation with 6m controlled switches instead of 6m input diodes according to an embodiment of the present disclosure. The active switches provide synchronous rectification for the input three-phase bridge and enable bidirectional operation of the converter.

Figure 16A:
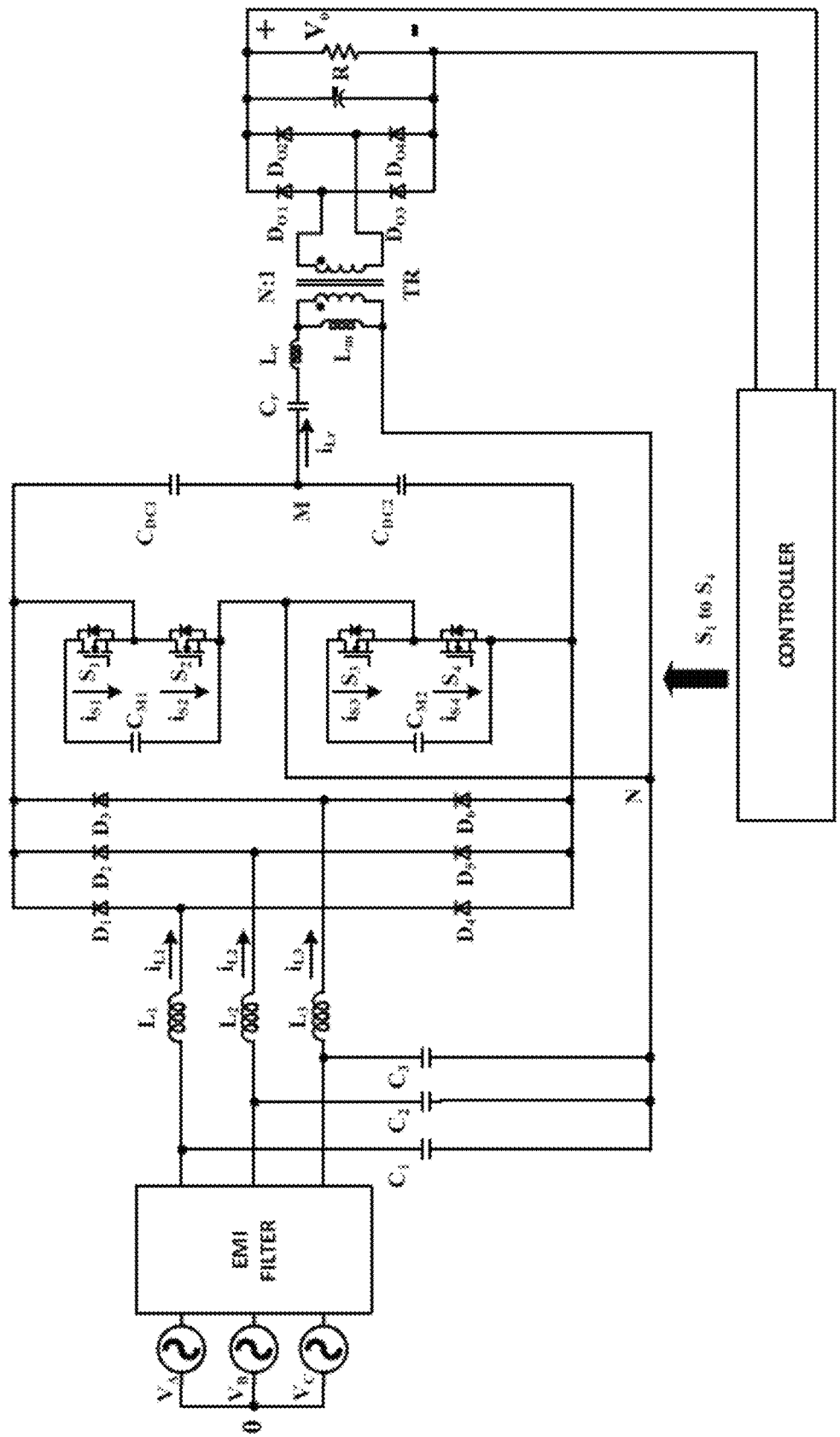
FIG. 16A illustrates an isolated three-phase four-switch ZVS PFC DCM boost rectifier circuit according to an embodiment of the present disclosure.

FIG. 16A shows an implementation based on two half bridge modules with an isolated output according to an embodiment of the present disclosure. The primary side of this isolated AC/DC converter is similar to the circuit shown in FIG. 6A except that the coupled inductor $L_C$ in FIG. 6A is replaced by a transformer, which includes a primary winding and a secondary winding. One end of the primary winding is coupled to the mid-point M of the DC-link capacitors, $C_{DC1}$ and $C_{DC2}$ through a resonant network, which includes a resonant inductor $L_r$ and a resonant capacitor $C_r$. The other end of the primary winding is connected to the neutral point N. The secondary side of the transformer is followed by a full-wave diode bridge.

Figure 16B:
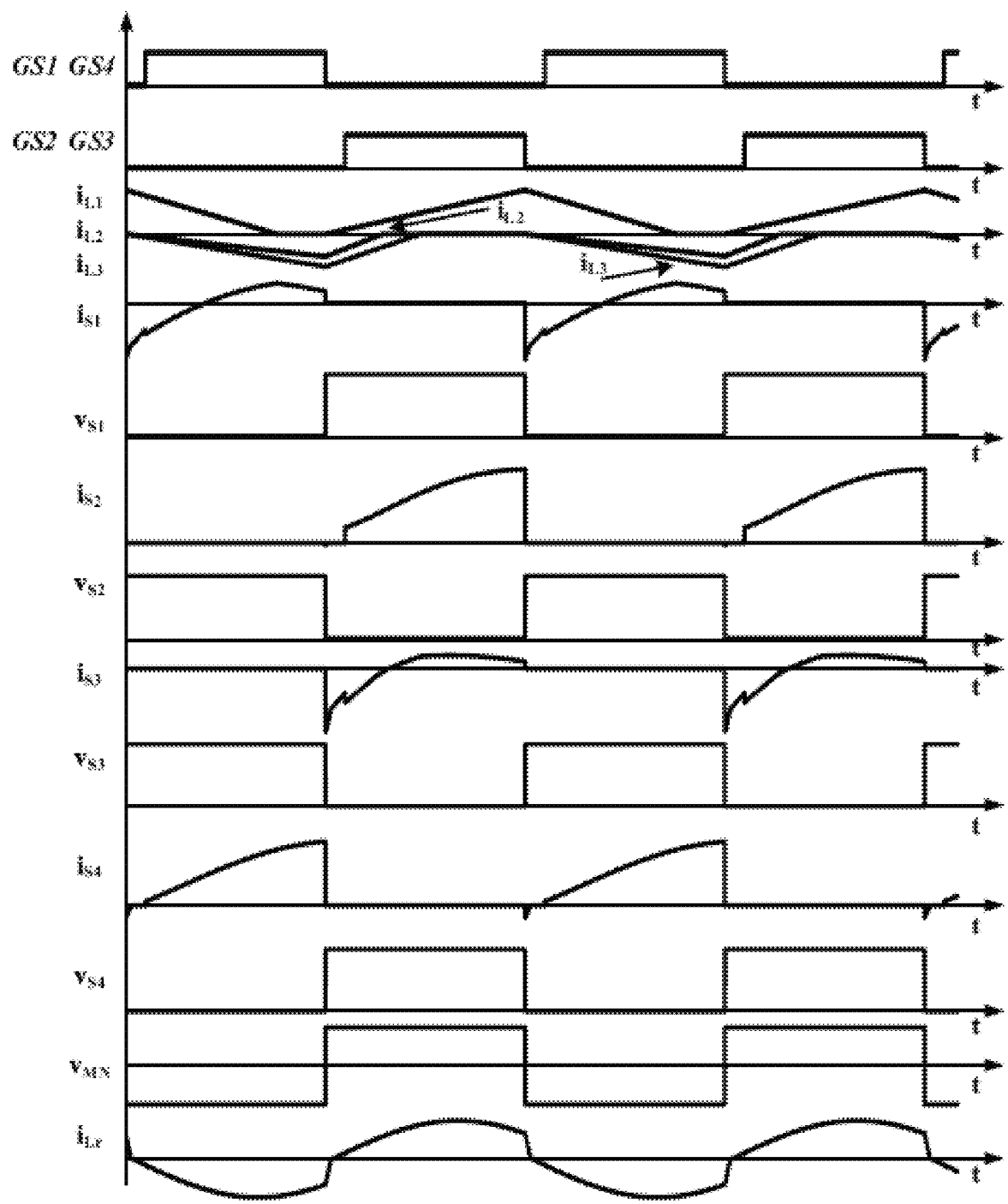
FIG. 16B illustrates key waveforms of the rectifier circuit in FIG. 16A during a switching cycle according to an embodiment of the present disclosure.

FIG. 16B shows the key waveforms during a switching cycle of the power stage according to an embodiment of the present disclosure. The reference directions of currents and voltages in FIG. 16B correspond to the 60-degree segments of a line cycle when $V_{AN}>0$, $V_{BN}<0$, and $V_{CN}<0$. As can be seen from the gate-driving time diagrams of switches $S_1$ to $S_4$ in FIG. 16B, switches $S_1$ and $S_2$ operate in a complementary fashion with a short dead time between the turn-on of one switch and the turn-off of the other switch. Switches $S_1$ and $S_4$ have identical gate-driving signals while switches $S_2$ and $S_3$ have identical gate-driving signals. The rectifier stage operates in a similar mechanism as the circuit shown in FIG. 6A.

The additional resonant network and the transformer operate as a typical series resonant converter. The voltage between points M and N shown in FIG. 16B is resulted from the proposed switching strategy. The DC/DC stage, thus, operates as series resonant converter and the resonant current $i_{Lr}$ indicates the resonant converter operating above the resonant frequency. It should be noted that the switching stage in FIG. 16A achieves both the frontend PFC and the DC/DC conversion simultaneously, which usually are realized by two stages with different switches in conventional topologies. The implementation in FIG. 16A can be proved to be a very cost-effective approach.

Figure 17A:
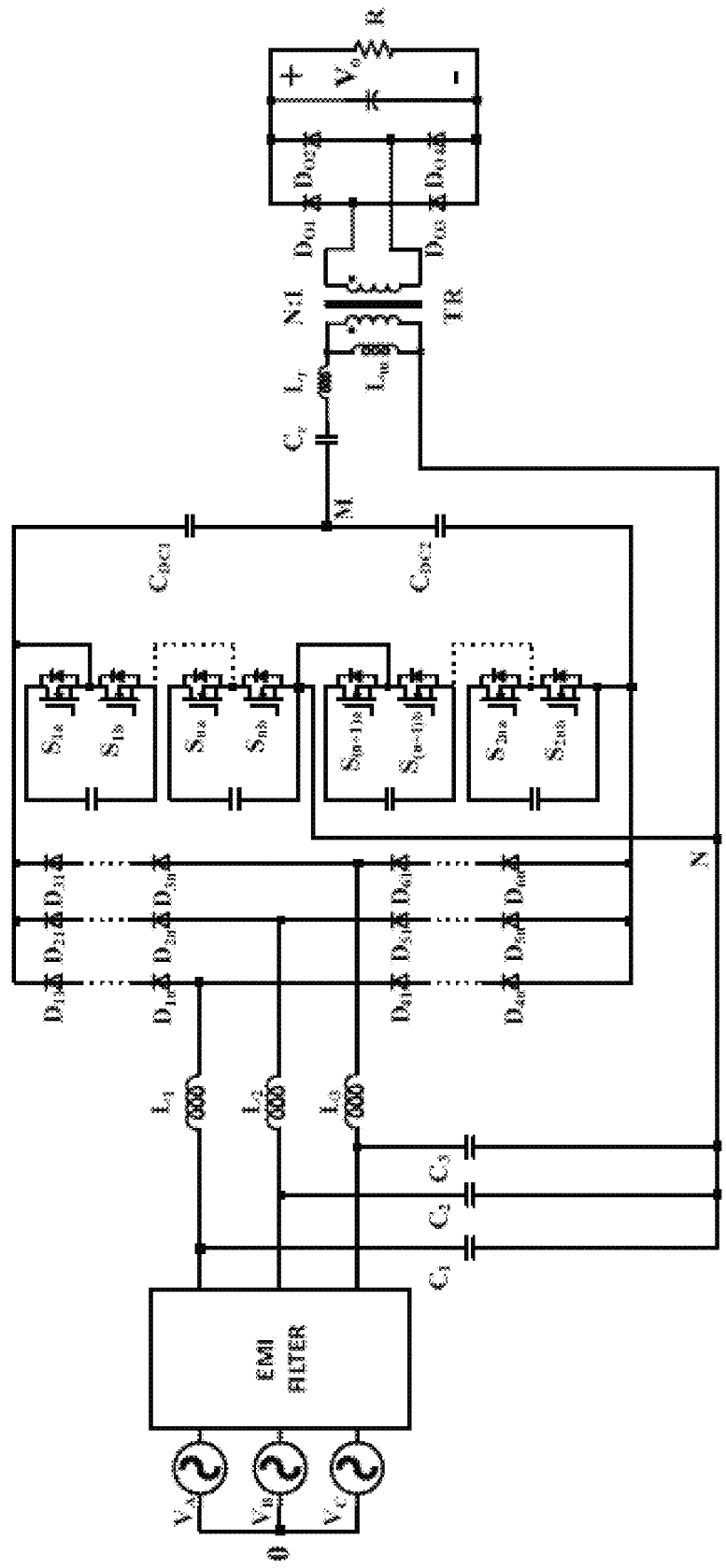
FIG. 17A illustrates a generalized isolated three-phase ZVS PFC DCM boost rectifier circuit based on total 6m (m=1, 2, 3, . . . ) diodes and 2n (n=1, 2, 3, . . . ) half bridge modules according to an embodiment of the present disclosure.
Figure 17B:
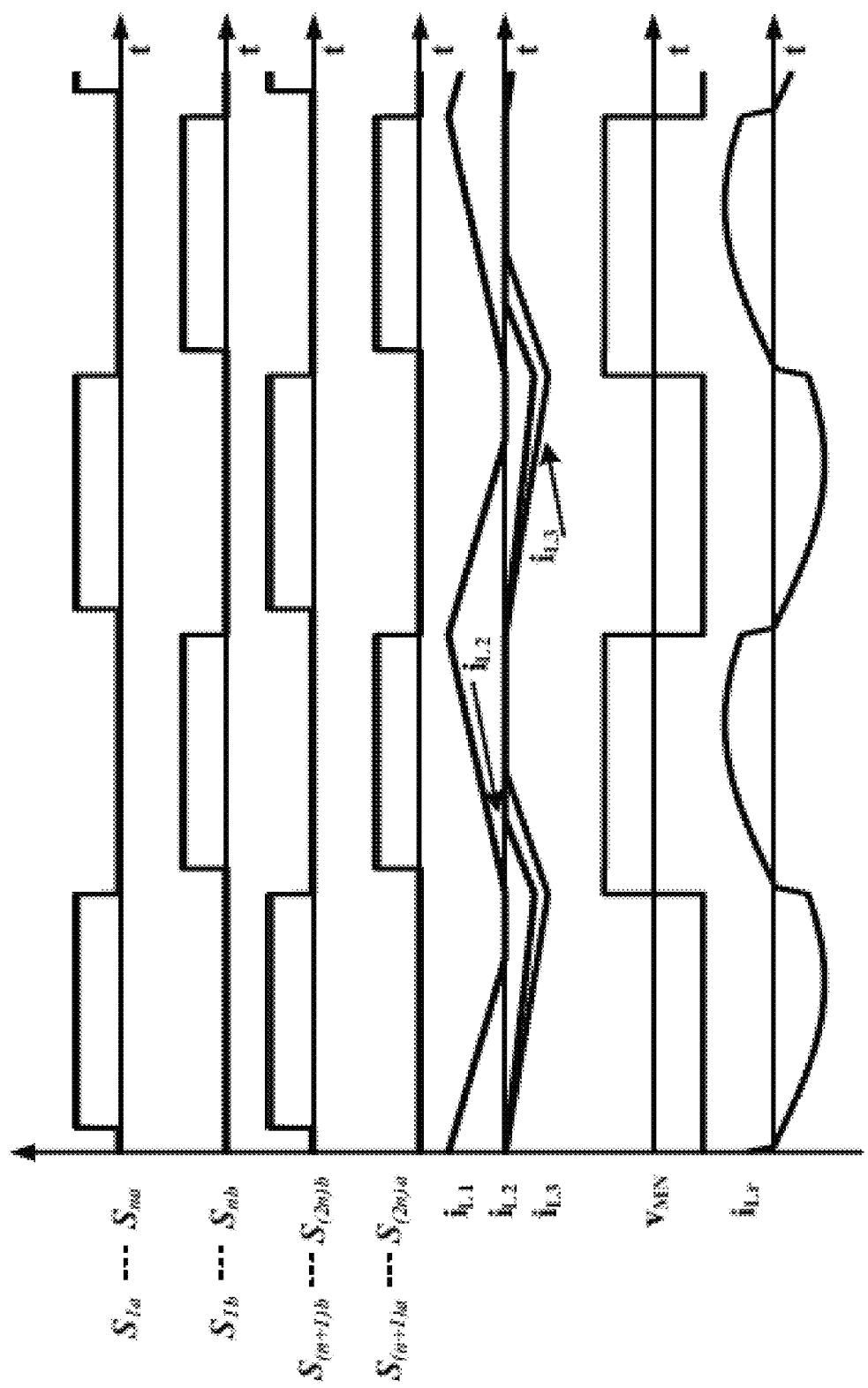
FIG. 17B shows key waveforms of the rectifier circuit in FIG. 17A during a switching cycle according to an embodiment of the present disclosure.

FIG. 17A shows an implementation based on 2n half bridge modules with an isolated output according to an embodiment of the present disclosure. Each diode in the three-phase diode bridge in FIG. 16A is replaced by m diodes connected in series to block the high input voltage. Passive snubber circuit may be required to balance the blocking voltage for each diode. In the switching converting stage, a total of 2n half bridge modules are implemented. The connection approach is substantially the same as that of FIG. 7A for non-isolated output. FIG. 17B shows the control signals of all active switches. As the voltage of the DC-link capacitor $C_{DC1}$ or $C_{DC2}$ is equal to the sum of the capacitor voltage in each half bridge module in top or bottom leg, voltage of each capacitor in each half bridge module is only 1/n of the DC-link capacitor voltage and each switch only needs to block 1/n of the DC-link capacitor voltage, which makes it possible to use the low voltage switches in very high input voltage applications. During the operation, the voltages of all capacitors in half bridge modules are sensed. The central controller will change the duty cycle of the switches when voltage unbalance is detected. In order to increase the reliability of the system, a relative larger capacitance is preferred in the half bridge module to make it less likely to suffer voltage imbalance during the operation. Thus, high capacitance value of the high voltage DC-link capacitor is not required.

Figure 18:
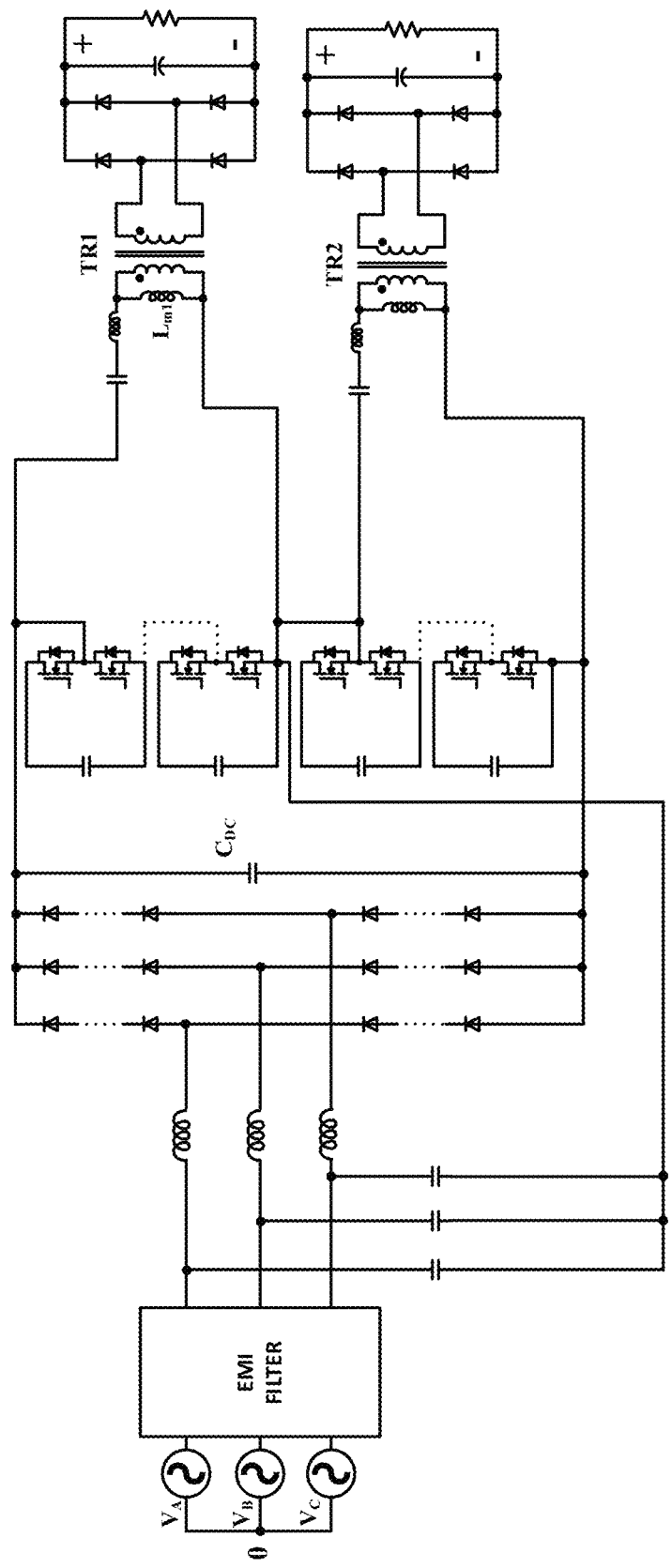
FIG. 18 illustrates a generalized isolated three-phase ZVS PFC DCM boost rectifier circuit based on total 6m (m=1, 2, 3, . . . ) diodes and 2n (n=1, 2, 3, . . . ) half bridge modules with two transformers and two independent loads according to an embodiment of the present disclosure.

FIG. 18 shows an implementation based on 2n half bridge modules with two isolated outputs according to an embodiment of the present disclosure. Instead of delivering only one output in FIG. 17A, this implementation includes two separated resonant networks, two transformers and two diode bridges for two outputs. The first isolated output stage is coupled between the positive terminal of the DC-bus and the neutral point N while the second isolated output stage is coupled between the negative terminal of the DC-bus and the neutral point N. The DC-link capacitor CDC is optional in this circuit.

Figure 19:
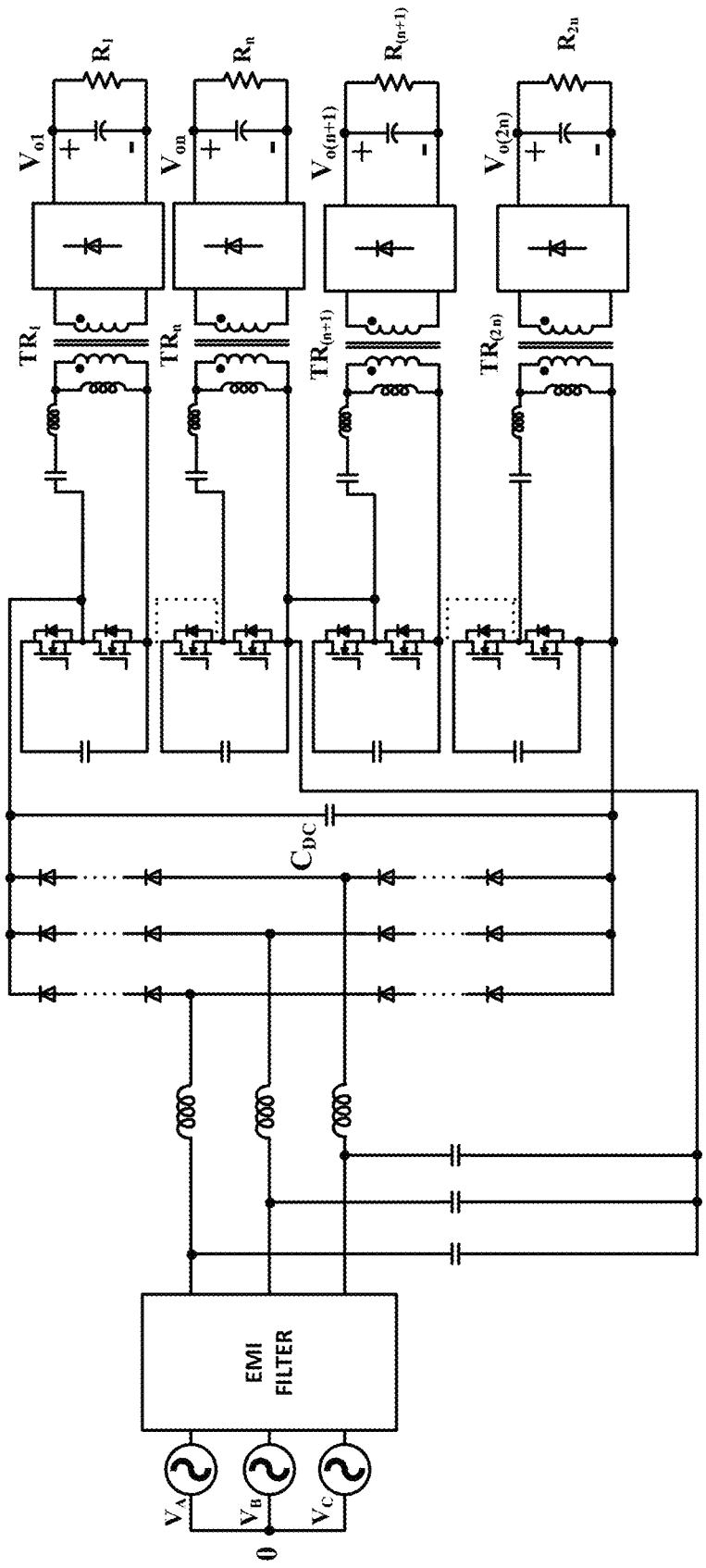
FIG. 19 illustrates a generalized isolated three-phase ZVS PFC DCM boost rectifier circuit based on total 6m (m=1, 2, 3, . . . ) diodes and 2n (n=1, 2, 3, . . . ) half bridge modules with 2n (n=1, 2, 3, . . . ) transformers and 2n (n=1, 2, 3, . . . ) independent loads according to an embodiment of the present disclosure.

FIG. 19 shows an implementation based on 2n half bridge modules with 2n isolated outputs according to an embodiment of the present disclosure. Instead of delivering only one output in FIG. 17A, this implementation includes 2n separated resonant networks, 2n transformers and 2n diode bridges for 2n outputs. Each isolated output stage is coupled with each half bridge module and the peak input voltage of each resonant network is 1/n of DC-link voltage. The outputs can be further connected in series, in parallel, or any combination. The DC-link capacitor CDC is optional in this circuit.

Figure 20A:
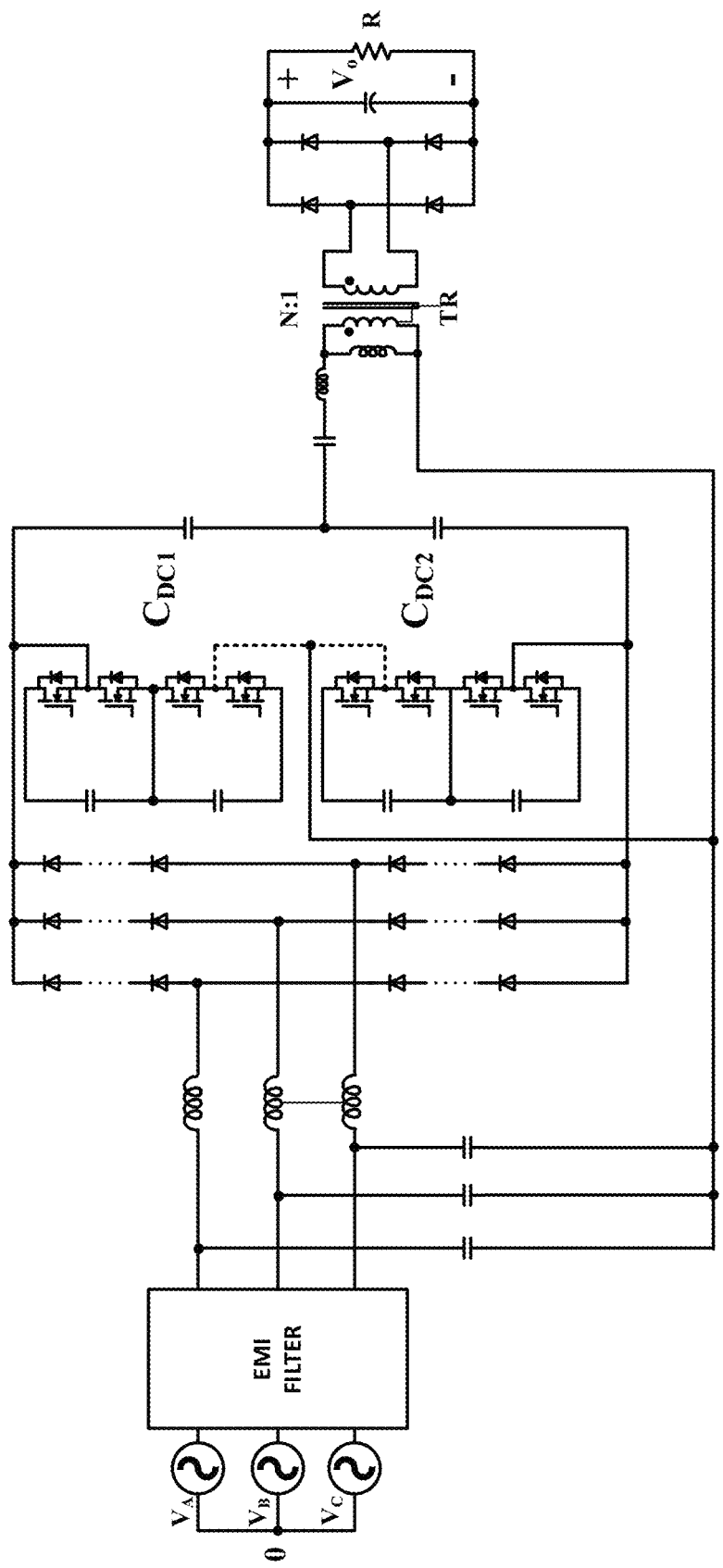
FIG. 20A illustrates a generalized isolated three-phase ZVS PFC DCM boost rectifier circuit based on total 6m (m=1, 2, 3, . . . ) diodes and 2n (n=1, 2, 3, . . . ) serial-half-bridges according to an embodiment of the present disclosure.
Figure 20B:
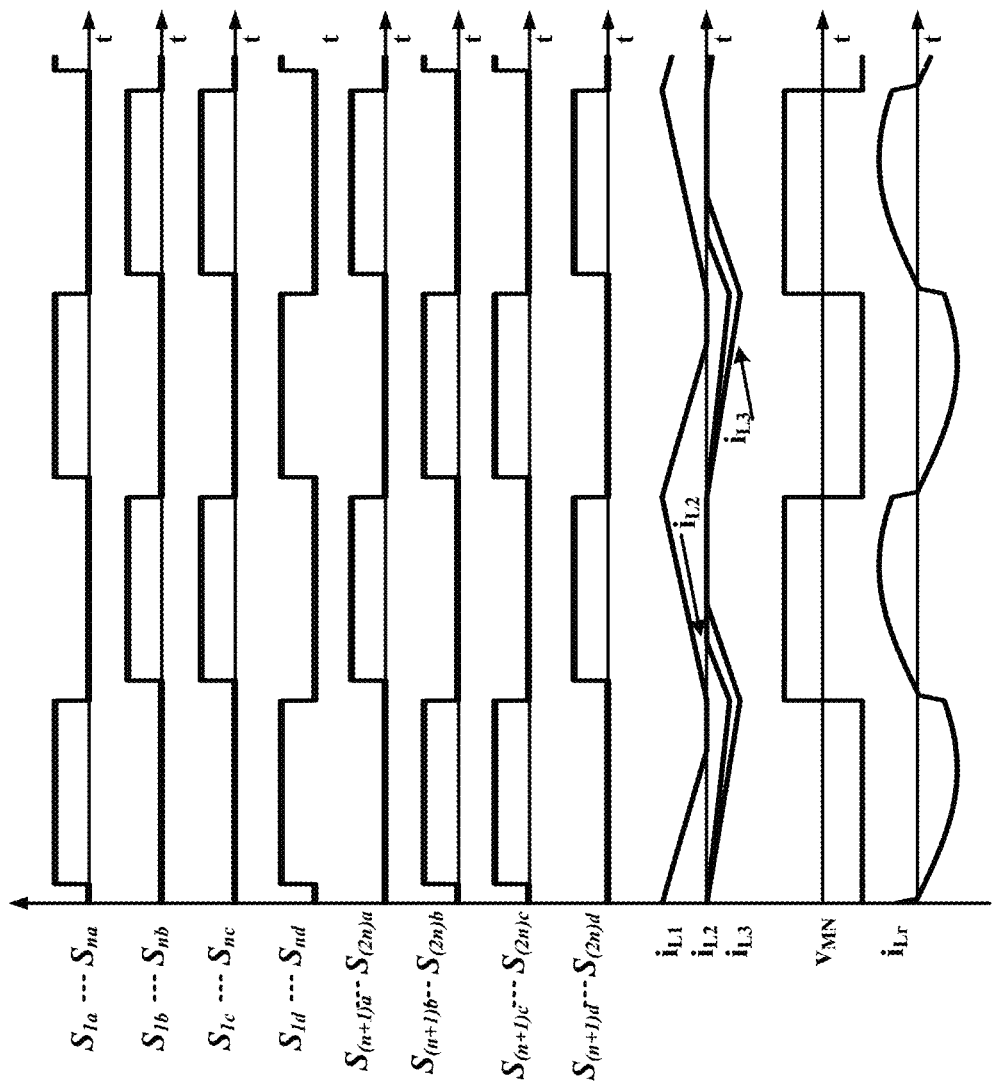
FIG. 20B illustrates key waveforms of rectifier circuit in FIG. 20A during a switching cycle according to an embodiment of the present disclosure.

FIG. 20A shows an implementation based on serial-half-bridge modules according to an embodiment of the present disclosure. Similar to the circuits of FIGS. 9A and 9C, two half bridge modules connected in series become the basic module in this implementation. The first output of the first serial-half-bridge module is connected to the positive terminal of the three-phase diode bridge. The second output of each serial-half-bride module is connected the first output of the following serial-half-bridge module. The second output of the last serial-half-bridge module is then connected to the negative terminal of the three-phase diode bridge. All the switches operate at a fixed duty cycle of substantially 50%. The control signals of the two switches of each half bridge are complementary. FIG. 20B shows the switches signals of all active switches in detail as well as the resonant current.

Figure 21:
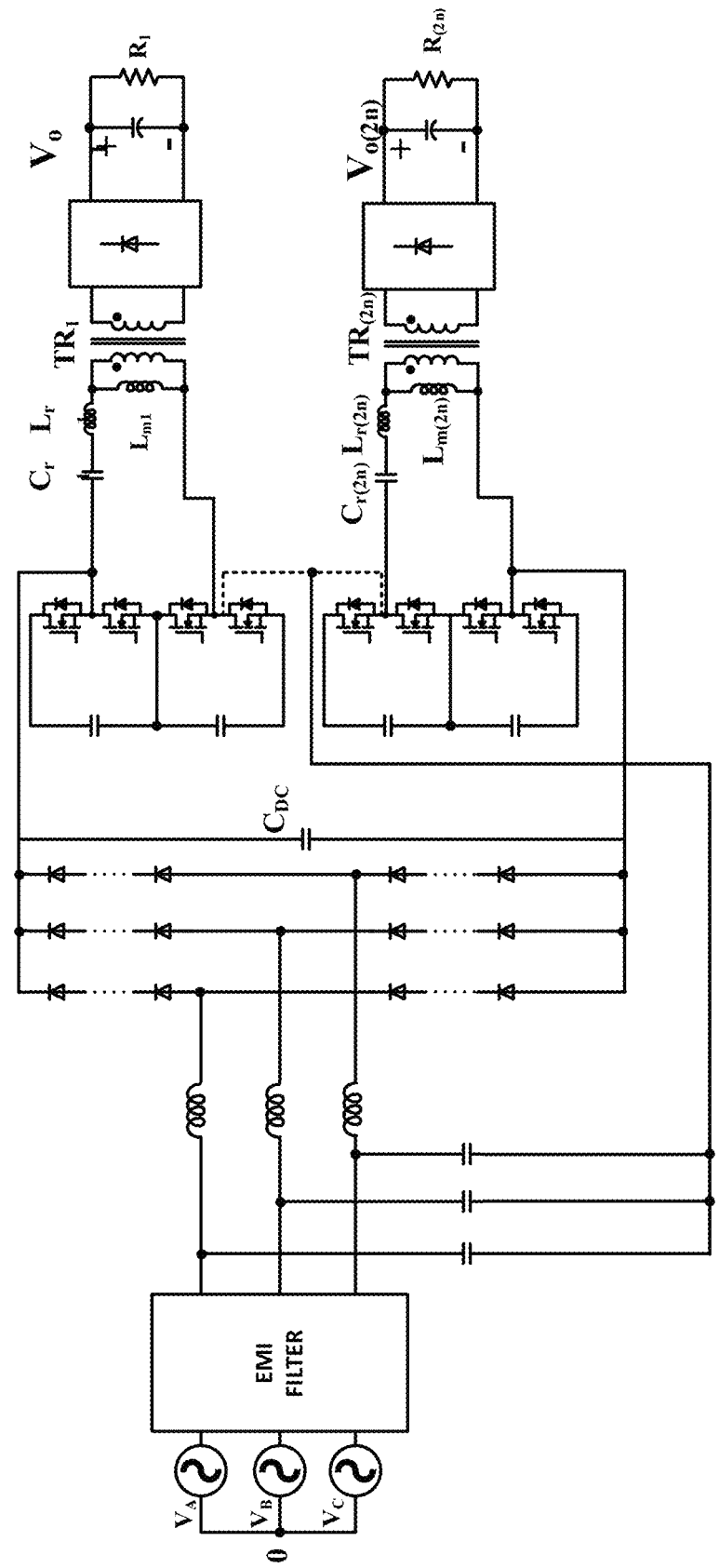
FIG. 21 illustrates a generalized isolated three-phase ZVS PFC DCM boost rectifier circuit based on total 6m (m=1, 2, 3, . . . ) diodes and 2n (n=1, 2, 3, . . . ) serial-half-bridges with 2n (n=1, 2, 3, . . . ) transformers and 2n (n=1, 2, 3, . . . ) independent loads according to an embodiment of the present disclosure.

FIG. 21 shows an implementation based on 2n serial-half-bridge modules with 2n isolated outputs according to an embodiment of the present disclosure. Instead of delivering only one output in FIG. 20A, this implementation includes 2n separated resonant networks, 2n transformers, and 2n diode bridges for 2n outputs. Each isolated output stage is coupled with each serial-half-bridge module. The outputs can be further connected in series, in parallel, or any suitable combination. The DC-link capacitor CDC is optional in this circuit.

Figure 22A:
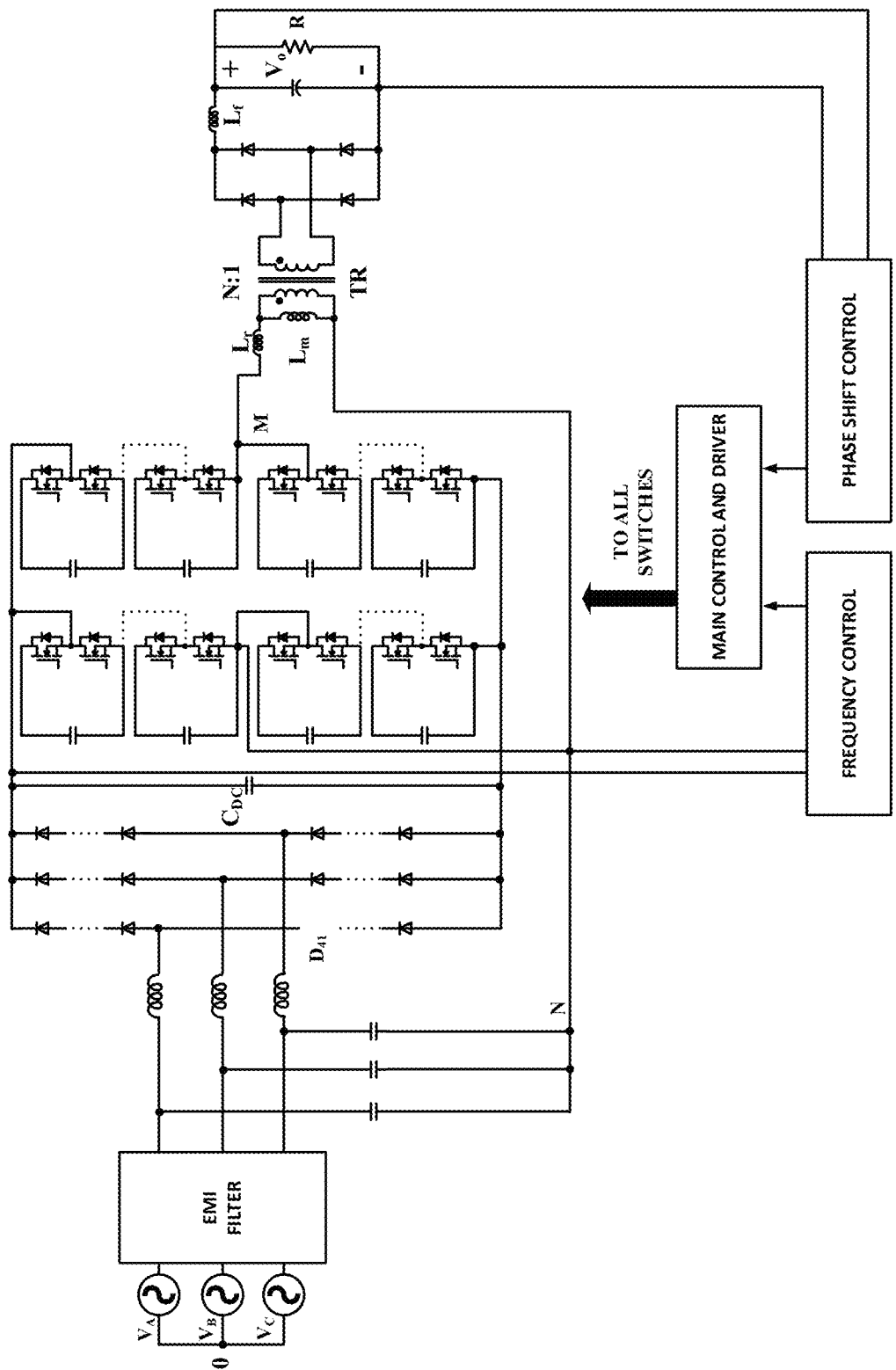
FIG. 22A illustrates a generalized isolated three-phase ZVS PFC DCM boost rectifier circuit based on total 6m (m=1, 2, 3, . . . ) diodes and two sets of 2n (n=1, 2, 3, . . . ) half bridge modules with both frequency controller and phase-shift controller according to an embodiment of the present disclosure.

FIG. 22A shows an implementation based on two sets of 2n half bridge modules according to an embodiment of the present invention. The additional 2n half bridge modules are connected in the same fashion as the existing 2n half bridge modules and they are coupled between the positive terminal and the negative terminal of the three-phase input diode bridge. The circuit further includes a transformer followed by a full-wave diode bridge. A filter inductor Lf is added between the diode bridge and the output load. The transformer is coupled between the mid-point M of the additional 2n half bridge modules and the neutral point N. The 4n half bridge modules operate as a full bridge and various control strategies can be implemented.

Figure 22B:
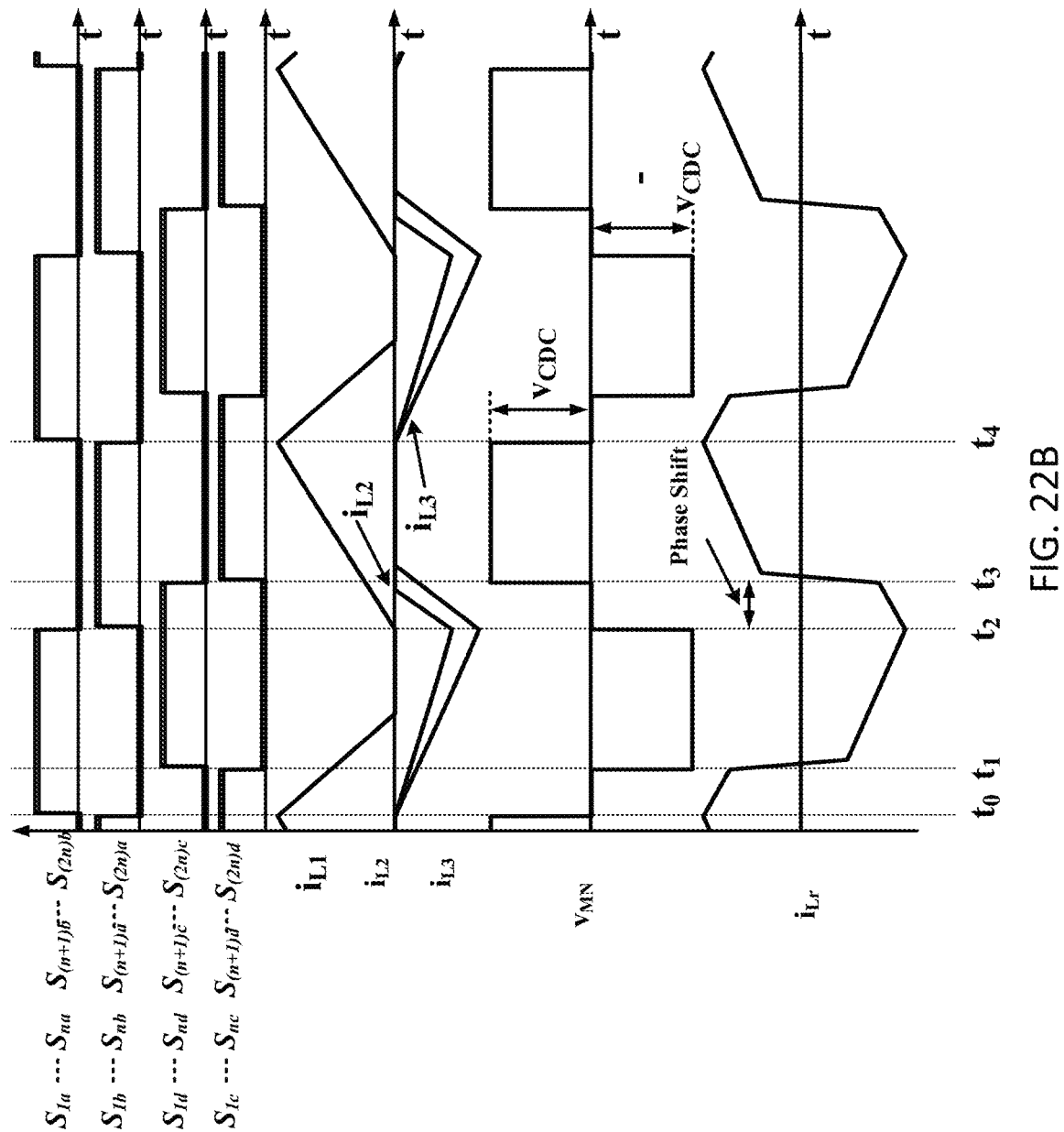
FIG. 22B illustrates key waveforms of the rectifier circuit in FIG. 22A during a switching cycle under phase-shift control according to an embodiment of the present disclosure.

FIG. 22B shows the gating waveforms of all the switches. The switching of switches $S_{1a}$ to $S_{2na}$ and $S_{1b}$ and $S_{2nb}$ occurs at time to while the switching of switches $S_{1c}$ to $S_{2nc}$ and switches $S_{1d}$ and $S_{2nd}$ occurs at time $t_1$. The phase shift between the two switching time creates PWM voltage waveform $V_{MN}$ across transformer TR as shown in FIG. 22B. Although all switches operate with near 50% duty cycle at a slowly varying switching frequency to achieve low THD and high power factor, the control method provides an additional control freedom to tightly regulate the output voltage by varying the phase shift angle. In some embodiments the phase shift angle is modulo less than one-half period or modulo less than a full period. (Here we use the term "modulo" to indicate removal of any phase shift that is a multiple of a full period.) An example of the controller shown in FIG. 22A is that the voltage across the DC-link capacitor is controlled by a low bandwidth frequency controller while the output voltage is controlled by a high bandwidth phase-shift controller.

Figure 23:
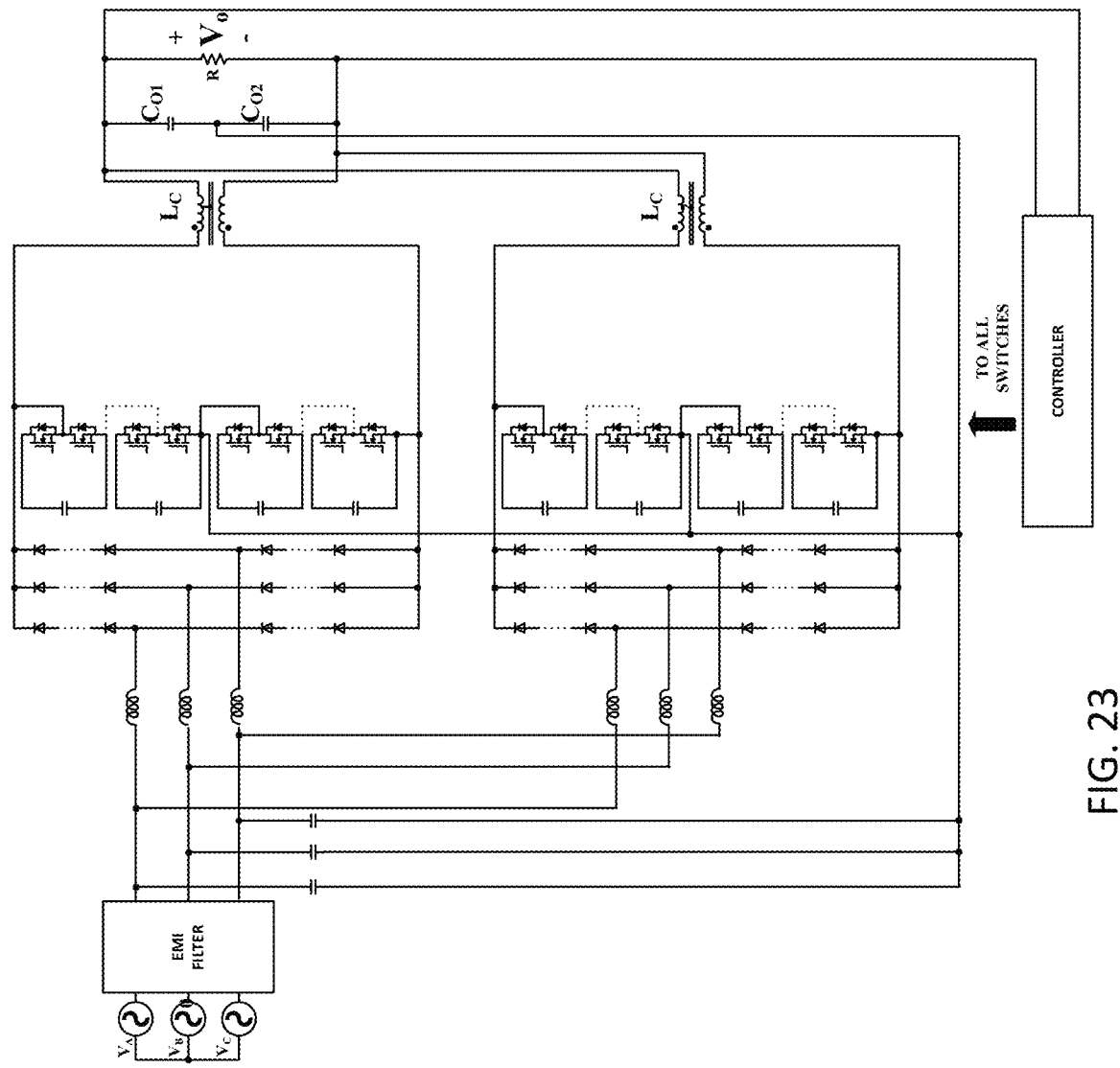
FIG. 23 illustrates an interleaved or paralleled three-phase four-switch ZVS PFC DCM boost rectifier circuit according to an embodiment of the present disclosure.

FIG. 23 shows that the embodiment in FIG. 7A can be paralleled or interleaved according to some embodiments of the present disclosure. In directly parallel operation, the switch signals in each converter are the same as the switch signals shown in FIG. 7B. In the interleaved operation, all the switches signals in the second module are interleaved 180 degrees relative to the switch signals in the first module.

Figure 24:
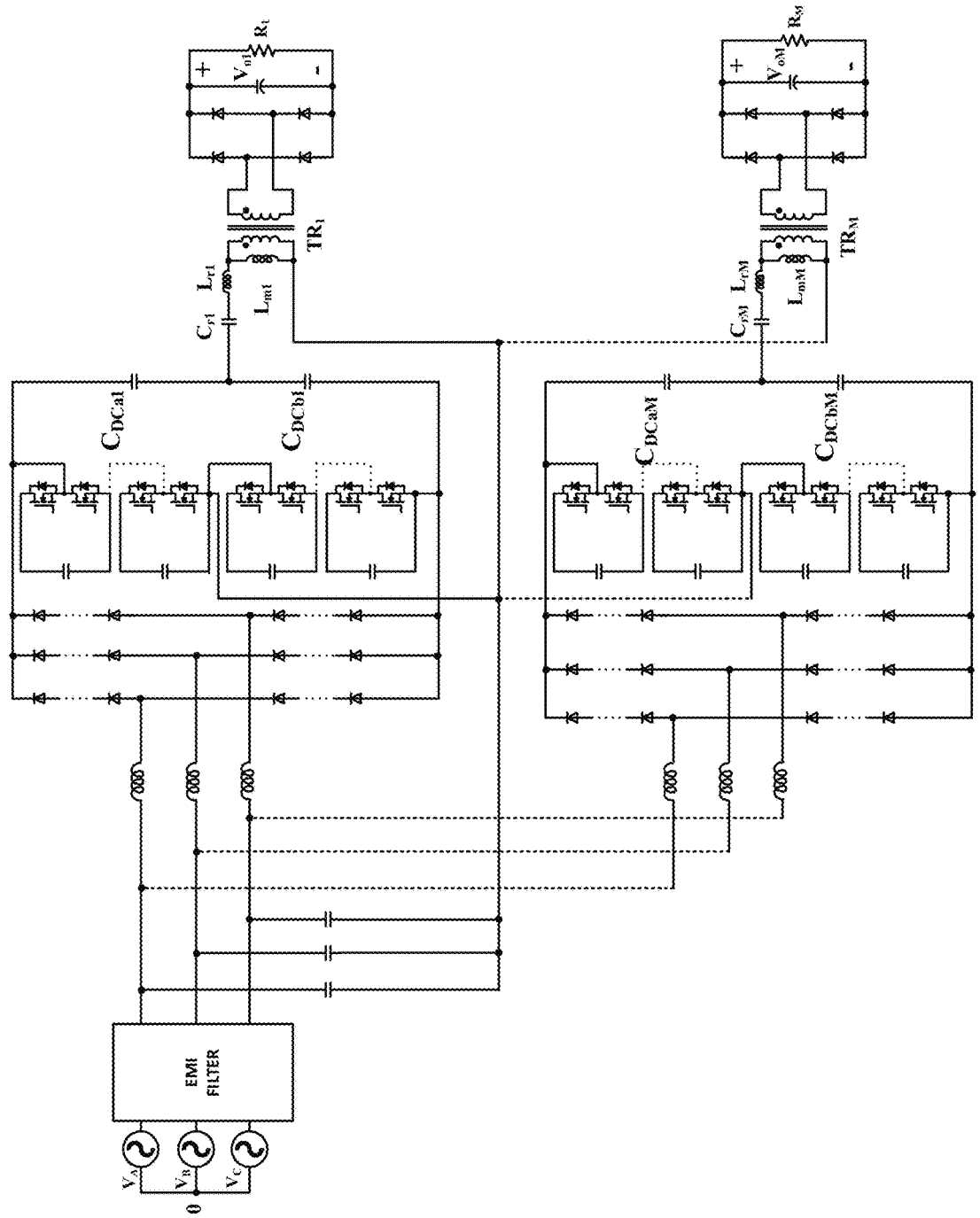
FIG. 24 illustrates a generalized interleaved or paralleled three-phase isolated ZVS PFC DCM boost rectifier circuit according to an embodiment of the present disclosure.

FIG. 24 shows the converter of FIG. 17A can be paralleled or interleaved M times according to an embodiment of the present disclosure. In directly parallel operation, the switching signals of each converter are identical to those shown in FIG. 17B. In the interleaved operation, the switching signals of any converter are interleaved with 360/M degree with the switching signals of its previous or its following converter.

Figure 25:
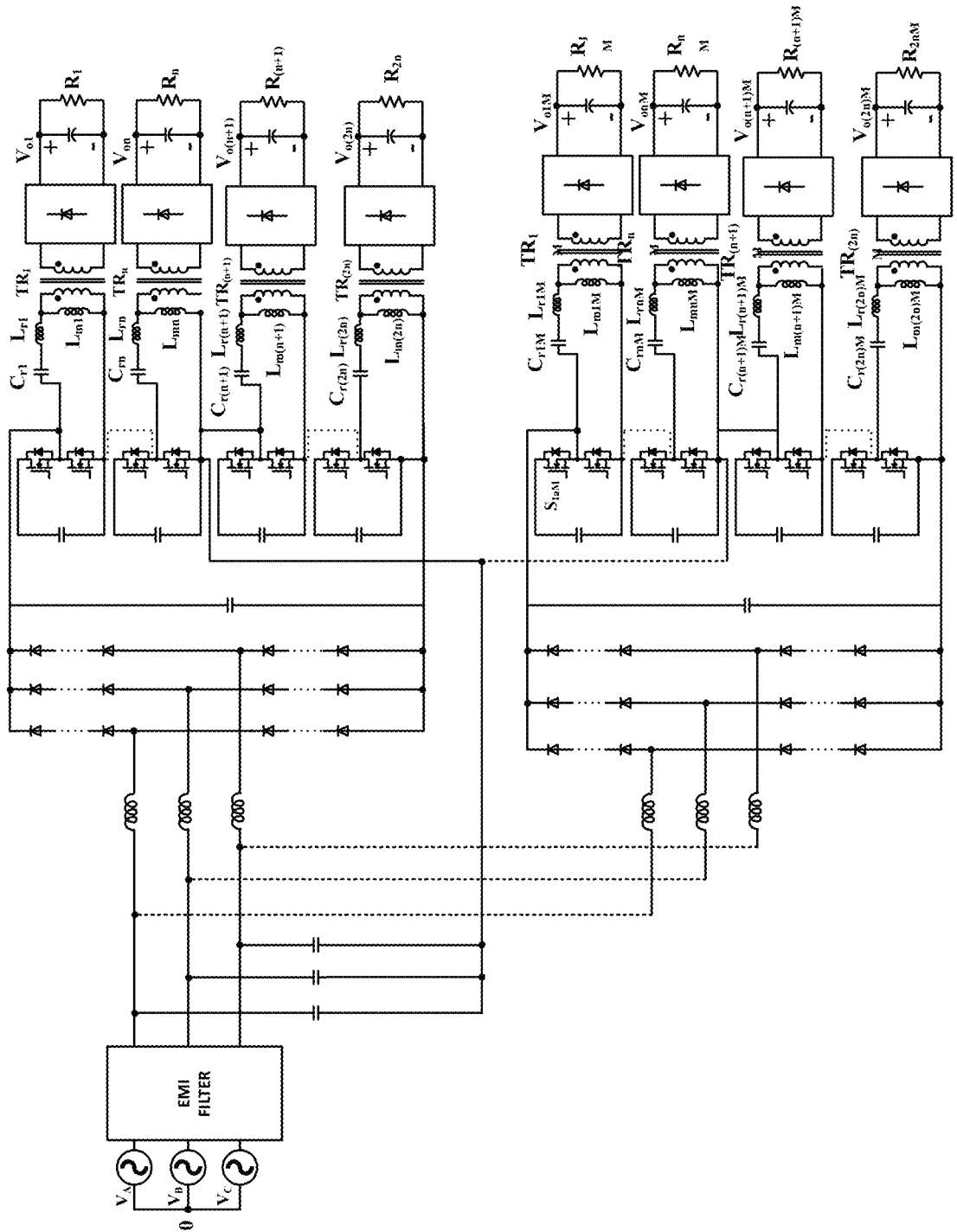
FIG. 25 shows a generalized interleaved or paralleled three-phase isolated ZVS PFC DCM boost rectifier circuit wherein each rectifier switching conversion stage comprises 2n (n=1, 2, 3, . . . ) independent loads according to an embodiment of the present disclosure.

FIG. 25 shows an implementation with total 2 nM outputs according to an embodiment of the present disclosure. That is, the converter of FIG. 19 is paralleled or interleaved M times and each converter includes 2n isolated outputs. (Note, the full wave diode bridge is shown as a block element for clarity.)

Figure 26A:
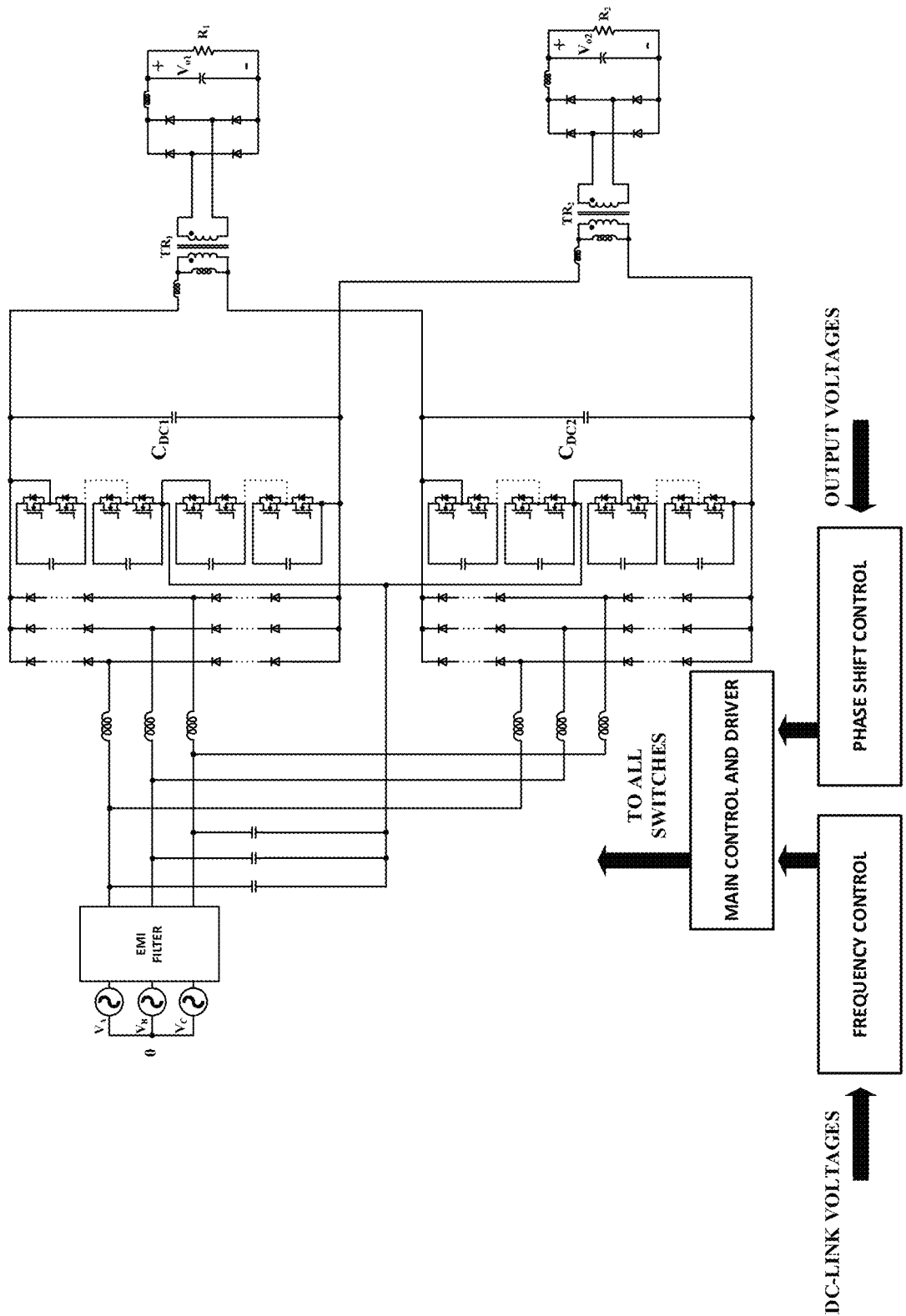
FIG. 26A illustrates a generalized interleaved or paralleled three-phase isolated ZVS PFC DCM boost rectifier circuit with two transformers and under phase-shift control according to an embodiment of the present disclosure.

FIG. 26A shows an implementation with two isolated AC/DC converters connected in parallel according to an embodiment of the present disclosure, which is capable of tightly regulating the output voltage under the phase shift control. The implementation includes two isolated outputs by applying two transformers and two output diode bridges. The first transformer is coupled between the positive terminal of the DC-link voltage of the first rectifier and the positive terminal of the DC-link voltage of the second rectifier. The second transformer is coupled between the negative terminal of the DC-link voltage of the first rectifier and the negative terminal of the DC-link voltage of the second rectifier. The converter further includes one or more controllers adapted to vary the switching frequency of all the switches based on the DC-link capacitor voltages and/or the output voltages. The controller is further adapted to control the output voltage with phase-shift control.

Figure 26B:
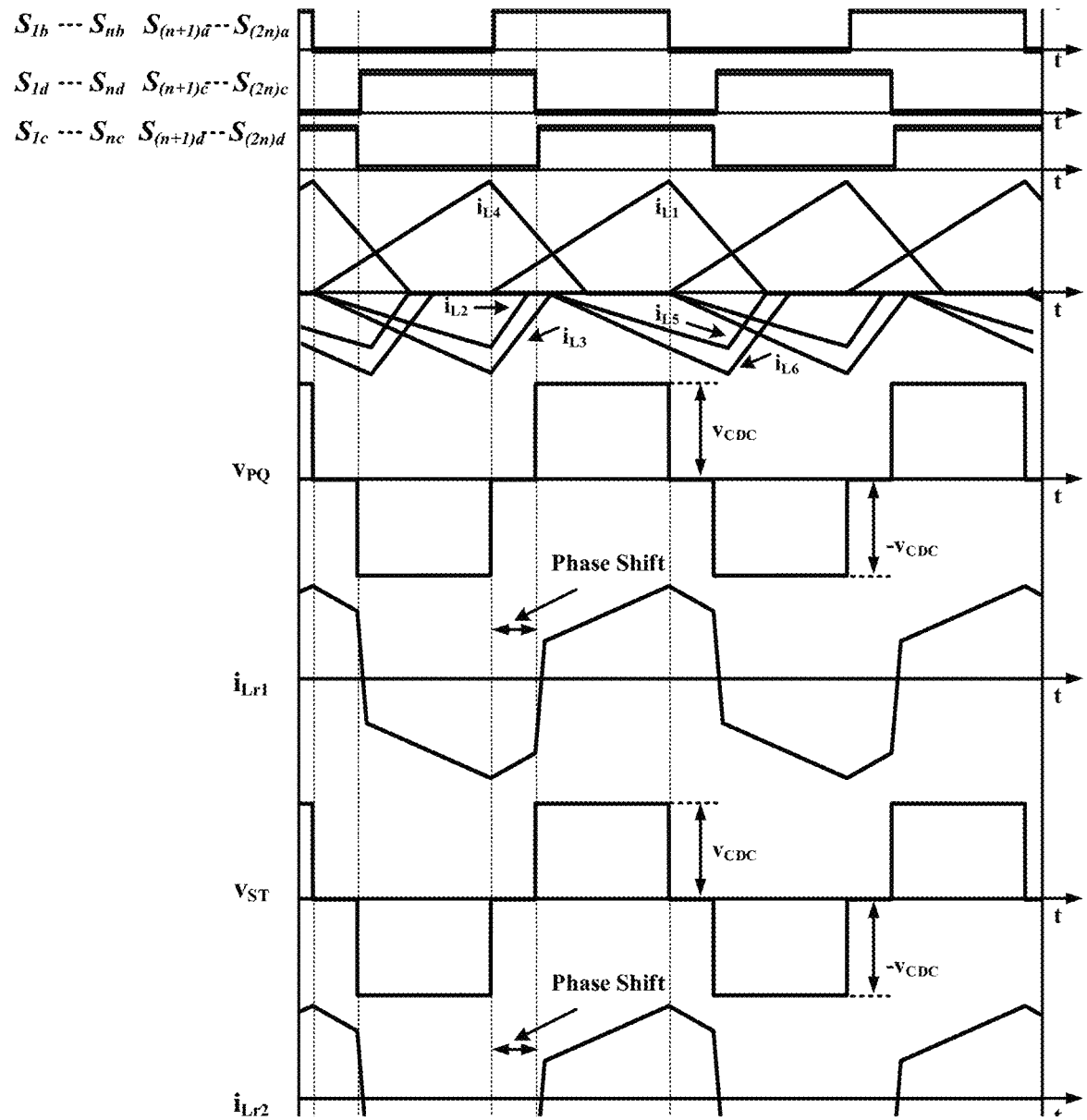
FIG. 26B illustrates key waveforms of rectifier circuit in FIG. 26A during a switching cycle under phase-shift control according to an embodiment of the present disclosure.

FIG. 26B shows the key waveforms, where the boost inductor current of the first rectifier is phase shifted 180 degree of the current of the second rectifier. The transformer primary voltage and the resonant current are the same for both rectifiers.

Figure 27:
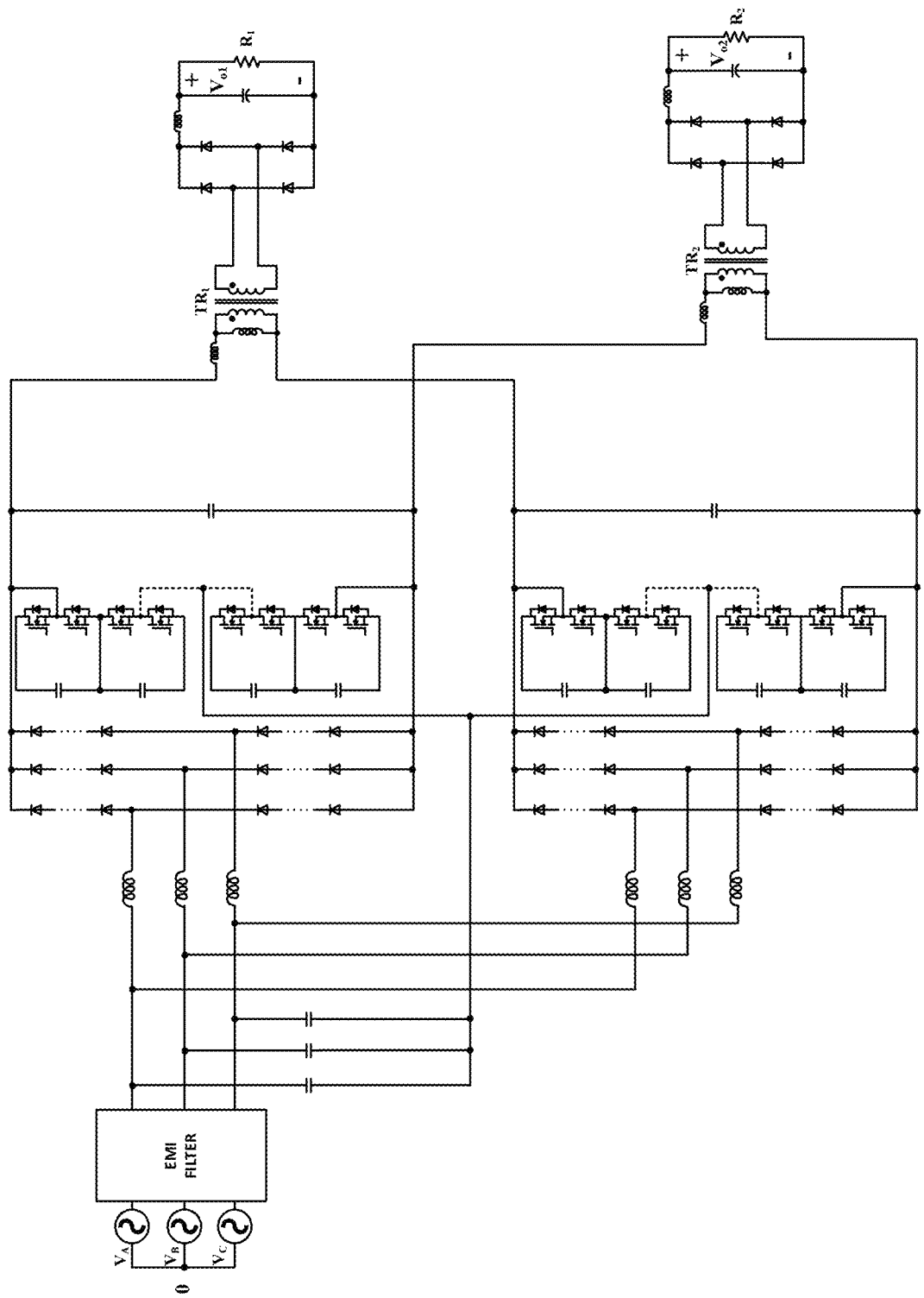
FIG. 27 illustrates a generalized interleaved or paralleled three-phase isolated ZVS PFC DCM boost rectifier circuit based on serial-half-bridge modules with two transformers and under phase-shift control according to an embodiment of the present disclosure.

FIG. 27 shows an implementation with two isolated AC/DC converters connected in parallel according to an embodiment of the present disclosure, which is capable of tightly regulating the output voltage by varying the phase shift angle. Instead of implementing half bridge module as the basic element, this circuit applies serial half bridge as the basic element in switching conversion stage.

Figure 28:
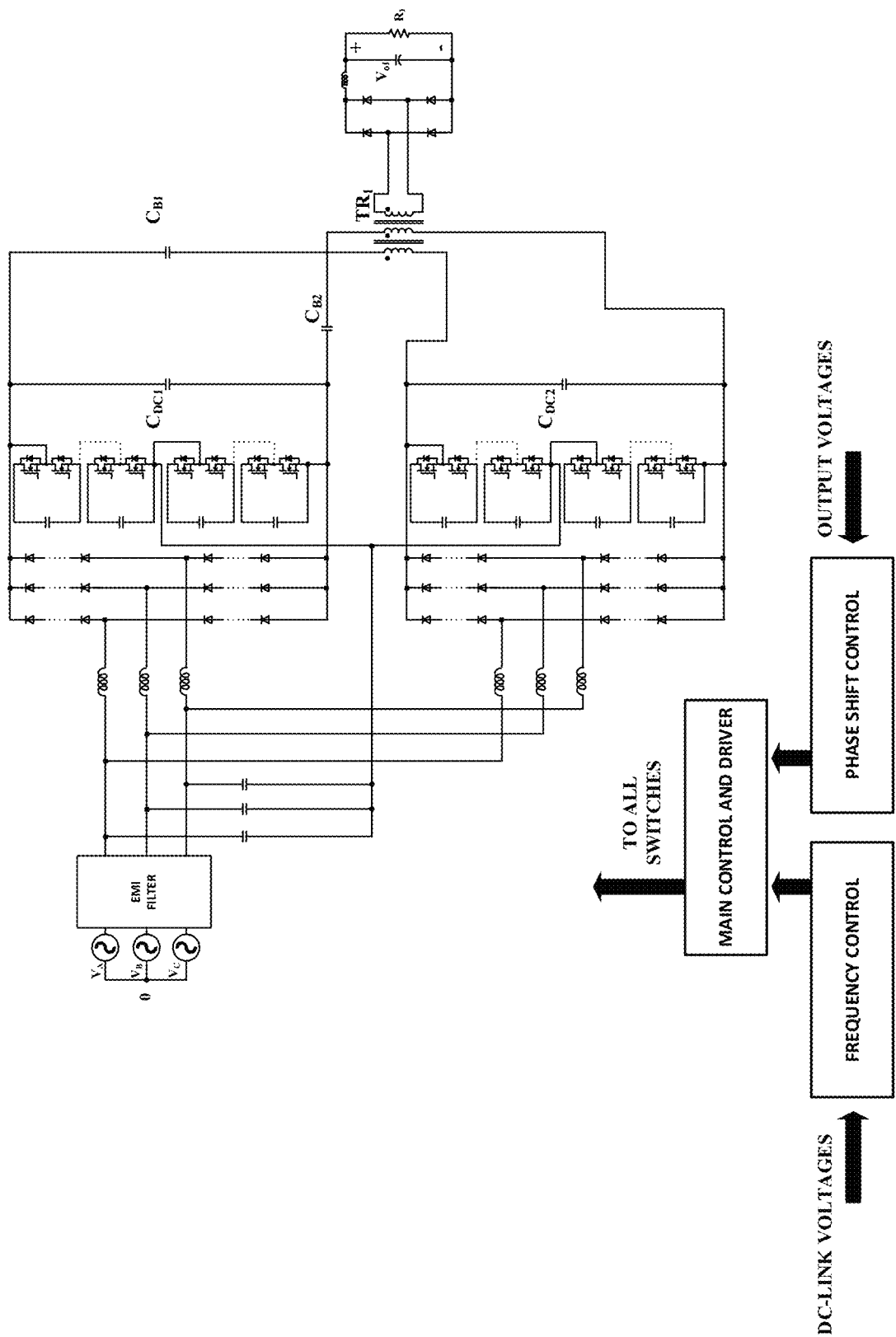
FIG. 28 illustrates a generalized interleaved or paralleled three-phase isolated ZVS PFC DCM boost rectifier circuit with a single transformer having two primary windings and under phase-shift control according to an embodiment of the present disclosure.

FIG. 28 shows an implementation with two isolated AC/DC converters connected in parallel according to an embodiment of the present disclosure, which is capable of tightly regulating the output voltage by varying the phase shift angle. Instead of delivering two separated outputs, this topology only includes one transformer with three windings and one output diode bridge. The first winding is coupled between the positive terminal of the DC-link voltage of the first rectifier and the positive terminal of the DC-link voltage of the second rectifier while the second winding is coupled between the negative terminal of the DC-link voltage of the first rectifier and the negative terminal of the DC-link voltage of the second rectifier.

Figure 29:
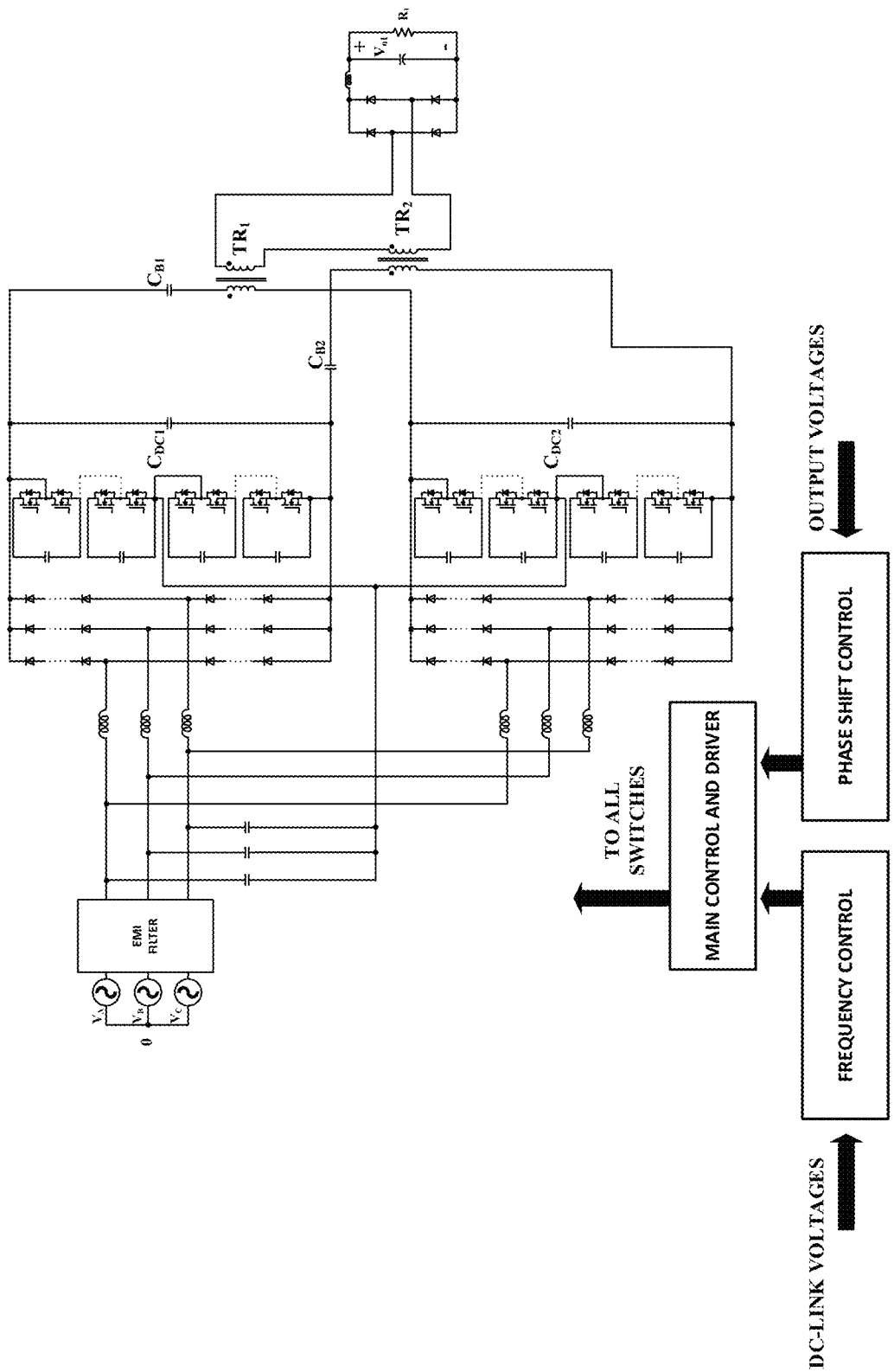
FIG. 29 illustrates a generalized interleaved or paralleled three-phase isolated ZVS PFC DCM boost rectifier circuit with two transformers and a single load and under phase-shift control according to an embodiment of the present disclosure.

FIG. 29 shows that the embodiments in FIG. 28 can also be implemented with two transformers $TR_1$ and $TR_2$ with serially connected secondary windings according to an embodiment of the present invention.

Those of ordinary skill in the art will appreciate that various modifications to the converter's circuit topology can be made that are within the scope of the present disclosure.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical value appearing in the present disclosure are deemed to be both the stated value, and alternatively modified by a term of degree (e.g., "about").

Although various embodiments of the present disclosure have been described in detail herein, one of ordinary skill in the art would readily appreciate modifications and other embodiments without departing from the spirit and scope of the present disclosure as stated in the appended claims.

What is claimed is:

1. An AC/DC converter, comprising:
a plurality of internal terminals including positive, negative, and neutral internal terminals;
an input stage connected to the positive, negative, and neutral internal terminals and having at least three input terminals for connecting to a three-phase AC power source;
a switching stage having a plurality of modules, each module having a plurality of switches and a capacitor, at least one of the modules connected to the positive internal terminal, at least one of the modules connected to the negative internal terminal, and at least two of the modules connected to the neutral internal terminal;
an output stage connected to the positive internal terminal and configured to provide DC voltage to output terminals for connecting to a load; and
a controller having a plurality of control signal outputs connected to the plurality of switches and configured to generate control signals for said switches; wherein:
each module of the plurality of modules has two switches, and the two switches and the capacitor are connected serially in a loop,
the module connected to the positive terminal is connected to the positive terminal by a node in the loop connecting the two switches of said module,
the module connected to the negative terminal is connected to the negative terminal by a node in the loop connecting one of the switches to the capacitor of said module,
a first of the at least two modules connected to the neutral internal terminal is connected to the neutral terminal by a node in the loop connecting one of the switches to the capacitor of said module, and
a second of the at least two modules connected to the neutral internal terminal is connected to the neutral terminal by a node in the loop connecting the two switches of said module.

2. The converter of claim 1, wherein
the switching stage has two modules,
a first module of the two modules is both the module connected to the positive terminal and the first of the at least two modules connected to the neutral internal terminal, and
a second module of the two modules is both the module connected to the negative terminal and the second of the at least two modules connected to the neutral internal terminal.

3. The converter of claim 1, wherein
the switching stage has (n+m) modules (n and m being positive integers greater than 1) divided into a first n modules and a second m modules,
the first n modules include a $1^{st}$ module of the first n modules which is the module connected to the positive terminal, an n-th module of the first n modules which is the first of the at least two modules connected to the neutral internal terminal, and wherein each i-th ($1 \leq i \leq n-1$) module is connected by a node in the loop connecting one of the switches to the capacitor of said i-th module to a respective (i+1)-th module at a node in the loop connecting the two switches of said (i+1)-th module, and the second m modules include a Pt module of the second m modules which is the second of the at least two modules connected to the neutral internal terminal, an m-th module of the second m modules which is the module connected to the negative terminal, and wherein each j-th ($1 \leq j \leq (m-1)$) module is connected by a node in the loop connecting one of the switches to the capacitor of said jth module to a respective (j+1)-th module at a node in the loop connecting the two switches of said (j+1)-th module.

4. The converter of claim 1, wherein
the switching stage has (2n+2m) modules, where n and m are positive integers,
for each module the plurality of switches comprises two switches, and the two switches and the capacitor of each module are connected serially in a loop,
the module connected to the positive terminal is connected to the positive terminal by a node in the loop connecting the two switches of said module,
the module connected to the negative terminal is connected to the negative terminal by a node in the loop connecting the two switches of said module,
a first of the at least two modules connected to the neutral internal terminal is connected to the neutral terminal by a node in the loop connecting the two switches of said module, and
a second of the at least two modules connected to the neutral internal terminal is connected to the neutral terminal by a node in the loop connecting the two switches of said module.

5. The converter of claim 4, wherein each of the 2n modules is paired with another of the 2n modules and each of the 2m modules is paired with another of the 2m modules, each pair having a common node that for both modules in said pair connects the capacitor of the respective module to one of the switches of the respective module.

6. The converter of claim 5, wherein
n=1,
m=1,
the module connected to the positive terminal is paired with the first of the at least two modules connected to the neutral internal terminal, and
the module connected to the negative terminal is paired with the second of the at least two modules connected to the neutral internal terminal.

7. The converter of claim 1, wherein the output stage comprises
a plurality of capacitors connected in series between the positive and negative internal terminals,
a transformer having a first winding and a second winding, the first winding having a first terminal and a second terminal connected to the neutral terminal;
a resonant inductor and resonant capacitor connected in series between a midpoint node in the series connected plurality of capacitors and the first terminal of the first winding of the transformer; and
a full-wave diode bridge connected to the second winding of the transformer and the output terminals.

8. The converter of claim 1, wherein the output stage is further connected to the negative and neutral terminals.

9. The converter of claim 1, wherein the output stage is a first output stage, the output terminals are first output terminals, and the load is a first load, the converter further comprising a second output stage connected to the negative internal terminal and configured to provide DC voltage to second output terminals for connecting to a second load.

10. The converter of claim 1, wherein the output stage is a first output stage, the output terminals are first output terminals, and the positive and negative internal terminals are a first positive and first negative internal terminals, respectively, the converter further comprising:
a second positive internal terminal and a second negative internal terminal, wherein the input stage is further connected to said second positive and second negative internal terminals;
a second switching stage having a second plurality of modules serially connected between the second positive and second negative internal terminals; and
a second output stage connected to the first and second negative internal terminals and configured to provide DC voltage to second output terminals, wherein the first output stage is further connected to the second positive internal terminal.

11. An AC/DC converter comprising:
input terminals for connecting to a three-phase input voltage source;
an input filter stage coupled to the input terminals and connected to a positive node, a negative node and a neutral node;
a switching stage having n half bridge modules, where n is a positive integer greater than 1, the half bridge modules connected in series between the positive node and the negative node, and having the neutral node connected to a series connection between the j-th and (j+1)-th half bridge modules in the series (where $1 \leq j \leq n-1$);
an output stage connected to the positive node and configured to provide DC voltage to output terminals for connecting to a load; and
a controller configured to generate control signals on control signal outputs electrically connected to the half bridge modules;
wherein each half bridge module comprises a capacitor and two switches connected in series in a loop, and
wherein a first node connecting the capacitor to one of the switches of an i-th half bridge module is electrically connected to a second node connecting the two switches of the (i+1)-th half bridge module for $1 \leq i \leq n-1$.

12. The converter of claim 11, wherein n is a positive even integer and wherein each half bridge module is paired with another of the half bridge modules forming a series half bridge module, each series half bridge module having a common node that for both half bridge modules in said series half bridge module connects the capacitor of the respective half bridge module to one of the switches of the respective half bridge module.

13. The converter of claim 12, wherein
each half bridge module having a switch connecting node connecting the switches of said half bridge module,
the paired half bridge modules forming each series half bridge module are a top half bridge module and a bottom half bridge module, and
the series half bridge modules are connected in series to one another by connecting, for each k (for $2 \leq k \leq n/2$) the switch connecting node of the top half bridge module of the k-th series half bridge module to the switch connecting node of the bottom half bridge module of the (k-1)-th series half bridge module.

14. The converter of claim 11, wherein the input filter stage comprises:
an electromagnetic interference (EMI) filter connected to the input terminals;

a three-phase diode bridge connected to the positive and negative node;

a plurality of boost inductors connected to the diode bridge and the EMI filter; and a plurality of capacitors each connected between a boost inductor among the plurality of boost inductors and the neutral node.

15. The converter of claim 11 wherein the output stage is further connected to the neutral node.

16. The converter of claim 11, wherein the input terminals comprise a source neutral terminal and output stage is further connected to the source neutral terminal.

17. The converter of claim 11, wherein the output stage comprises a full-wave diode bridge connected to the output terminals for connecting to the load;

a plurality of capacitors connected in series between the positive node and negative node;

a transformer having a first winding having first and second terminals, and a second winding connected to the full-wave diode bridge; and a resonant inductor and resonant capacitor connected in series between a midpoint node of the series connected plurality of capacitors and the first terminal of the first winding of the transformer.

18. The converter of claim 11, wherein the load is a first load and the output terminals are further configured to connect to a second load.

19. An AC/DC converter, comprising:

input terminals for connecting to a three-phase input voltage source;

an input filter stage coupled to the input terminals and connected to a positive node, a negative node and a neutral node;

a first switching stage having n half bridge modules (n being a positive integer greater than 1) connected in series between the positive and negative nodes, and having the neutral node connected to a series connection between an i-th and (i+1)-th half bridge modules in said series (where $1 \leq i \leq n-1$);

a second switching stage having m half bridge modules (m being a positive integer greater than 1) connected in series between the positive and negative node;

an output stage connected to the neutral node and to a series connection node between a j-th and (j+1)-th series connected half bridge modules of the second stage (where $1 \leq j \leq n-1$), the output stage further having output terminals for connecting to a load; and a controller configured to generate control signals on control signal outputs electrically connected to the half bridge modules of the first and second switching stages;

wherein each of the half bridge modules comprises a capacitor and two switches connected in series in a loop, and wherein a first node connecting the capacitor to one of the switches of the i-th half bridge module is electrically connected to a second node connecting the two switches of the (i+1)-th half bridge module.

20. The converter of claim 19, wherein the controller is configured to generate control signals for the second stage that are phase shifted relative to control signal for the first stage.

* * * * *